US012521343B2

(12) United States Patent
Farra et al.

(10) Patent No.: US 12,521,343 B2
(45) Date of Patent: Jan. 13, 2026

(54) TWO STAGE MICROCHIP DRUG DELIVERY DEVICE AND METHODS

(71) Applicant: Dare MB Inc., San Diego, CA (US)

(72) Inventors: Robert Farra, Acton, MA (US);
Elizabeth Proos, Westford, MA (US);
Scott W. James, Epping, NH (US);
Nicolas J. Pacelli, Cedar Park, TX (US); Hong-Ren Wang, Lexington, MA (US)

(73) Assignee: Dare MB Inc., San Diego, CA (US)

( * ) Notice: Subject to any disclaimer, the term of this patent is extended or adjusted under 35 U.S.C. 154(b) by 166 days.

(21) Appl. No.: 17/085,424

(22) Filed: Oct. 30, 2020

(65) Prior Publication Data

US 2021/0128463 A1 May 6, 2021

Related U.S. Application Data

(60) Provisional application No. 62/929,432, filed on Nov. 1, 2019.

(51) Int. Cl.
*A61K 9/00* (2006.01)
*A61K 9/20* (2006.01)
(Continued)

(52) U.S. Cl.
CPC .......... *A61K 9/0097* (2013.01); *A61K 9/0004* (2013.01); *A61K 9/2077* (2013.01);
(Continued)

(58) Field of Classification Search
CPC .. A61K 9/0097; A61K 9/0004; A61K 9/2077; A61K 31/566; A61K 47/36; A61M 31/002
See application file for complete search history.

(56) References Cited

U.S. PATENT DOCUMENTS 6,123,861 A * 9/2000 Santini, Jr. ........... A61K 9/0097
216/2
6,491,666 B1 12/2002 Santini, Jr. et al.
(Continued)

FOREIGN PATENT DOCUMENTS

WO 2005016558 A2 2/2005

OTHER PUBLICATIONS

International Search Report and the Written Opinion for International Application No. PCT/US2020/058240, mailed Mar. 15, 2021 (12 pages).

*Primary Examiner* — Kai H Weng
*Assistant Examiner* — Kate Elizabeth Strachan
(74) *Attorney, Agent, or Firm* — Eversheds Sutherland (US) LLP

(57) ABSTRACT

Drug delivery devices and methods of controlled drug delivery to a patient are provided. The drug delivery device may include one or two microchip elements, each of which has a body portion with one or more drug release apertures in fluid communication with at least one containment reservoir. The drug release apertures are closed off by one or more reservoir caps which can be electrically activated to open the drug release apertures. The drug delivery device also includes (i) a drug formulation disposed in the at least one containment reservoir, and (ii) at least one drug-permeable membrane. In some cases, an outer housing is spaced a distance from an exterior wall of the body portion of the microchip element, the outer housing includes the at least one drug-permeable membrane, and a depot space is defined between the drug-permeable membrane and the exterior wall of the body portion of the microchip element.

31 Claims, 13 Drawing Sheets

(51) Int. Cl.
  *A61K 31/566*  (2006.01)
  *A61K 47/36*  (2006.01)
  *A61M 31/00*  (2006.01)

(52) U.S. Cl.
  CPC ............ *A61K 31/566* (2013.01); *A61K 47/36* (2013.01); *A61M 31/002* (2013.01)

(56) References Cited

U.S. PATENT DOCUMENTS

| | | |
|---|---|---|
| 6,527,762 B1 | 3/2003 | Santini, Jr. et al. |
| 6,808,522 B2 | 10/2004 | Richards et al. |
| 7,070,590 B1 | 7/2006 | Santini, Jr. et al. |
| 7,455,667 B2 | 11/2008 | Uhland et al. |
| 7,488,316 B2 | 2/2009 | Prescott et al. |
| 7,534,241 B2 | 5/2009 | Coppeta et al. |
| 7,537,590 B2 | 5/2009 | Santini, Jr. et al. |
| 7,563,255 B2 | 7/2009 | Adamis et al. |
| 7,604,628 B2 | 10/2009 | Santini, Jr. et al. |
| 7,955,614 B2 | 6/2011 | Martin et al. |
| 8,192,659 B1 | 6/2012 | Coppeta et al. |
| 8,277,440 B2 | 10/2012 | Ausiello et al. |
| 8,679,093 B2 | 3/2014 | Farra |
| 8,911,426 B2 | 12/2014 | Coppeta et al. |
| 10,272,046 B2 * | 4/2019 | Dokou .................. A61K 31/47 |
| 2004/0106914 A1 | 6/2004 | Coppeta et al. |
| 2007/0197957 A1 * | 8/2007 | Hunter .................. A61L 31/16 604/65 |
| 2007/0275035 A1 * | 11/2007 | Herman ............... A61K 9/0097 604/500 |
| 2008/0015494 A1 | 1/2008 | Santini, Jr. et al. |
| 2008/0076975 A1 * | 3/2008 | Santini .................. A61K 47/12 600/300 |
| 2009/0234214 A1 | 9/2009 | Santini, Jr. et al. |
| 2013/0053671 A1 * | 2/2013 | Farra .................... A61B 5/4839 600/377 |
| 2014/0180262 A1 | 6/2014 | Farra |
| 2014/0243624 A1 | 8/2014 | Farra |
| 2016/0238550 A1 | 8/2016 | Zhang |
| 2016/0354780 A1 | 12/2016 | Farra |
| 2017/0224758 A1 * | 8/2017 | Lindblad-Toh ......... C12Q 1/686 |
| 2017/0291019 A1 * | 10/2017 | Dang .................... A61K 9/0009 |
| 2019/0060344 A1 * | 2/2019 | Giesing .............. A61K 31/7068 |
| 2019/0209090 A1 * | 7/2019 | Langer ................ A61M 31/002 |
| 2020/0214592 A1 * | 7/2020 | Ben-Tsur ............. A61M 37/00 |

* cited by examiner

TWO STAGE MICROCHIP DRUG DELIVERY DEVICE AND METHODS

CROSS-REFERENCE TO RELATED APPLICATIONS

This application claims priority to U.S. Provisional Patent Application No. 62/929,432, filed Nov. 1, 2019, which is incorporated herein by reference.

FIELD OF THE DISCLOSURE

This disclosure generally relates to medical devices, including but not limited to implantable drug delivery devices for controlled release of therapeutic or prophylactic agents over extended periods.

BACKGROUND

Typical drug delivery devices offer either a bolus delivery of drug or an extended release of drug. Often a bolus delivery produces an initially high plasma drug level before rapidly decreasing. In such cases, the drug concentration level may be initially higher than desired (potentially producing unwanted side effects), before passing through, and then falling below, a therapeutically effective range as the drug is processed by the patient's body. Conversely, a conventional extended-release or continuous-release drug delivery device often relies on passive diffusion from and/or degradation of a matrix material to control release. With these systems, it may initially take an undesirably long time to release enough drug to reach therapeutically effective plasma drug levels, even though the drug levels may remain in a therapeutically effective range for a longer period (as compared to a bolus). Thus, with both typical bolus drug delivery and extended- or continuous-release drug delivery devices, a significant period may be outside the therapeutic window for a particular drug being delivered.

Implantable devices including microchip reservoir arrays containing drug for controlled release of hundreds of doses of drug over several months or years are known. Such devices are described, for example, in U.S. Pat. No. 8,403,915 to Santini et al., U.S. Pat. Pub. No. 2013/0053671 to Farra, and U.S. Pat. Pub. No. 2014/0243624 to Farra. Drug release into the patient may be pulsatile. That is, each dose may be released automatically on a predetermined schedule or on demand by the patient or clinician, by diffusion out of its own reservoir following opening of each reservoir.

It would be desirable to provide a drug delivery device, such as an implantable drug delivery device, that is able to keep drug plasma levels within a selected therapeutic range for longer periods and/or to avoid or reduce undesirable lag times in reaching therapeutically effective drug levels.

SUMMARY

Drug delivery devices, implantable drug delivery devices, and methods of drug delivery are provided.

In one aspect, a drug delivery device is provided, which includes (i) a microchip element which comprises a body portion defining at least one containment reservoir therein, wherein the body portion has an exterior wall having one or more drug release apertures in fluid communication with the at least one containment reservoir, the one or more drug release apertures being closed off by one or more corresponding reservoir caps configured to be electrically activated to unclose the one or more drug release apertures; (ii) a drug formulation, which comprise a first drug, disposed in the at least one containment reservoir; and (iii) a drug-permeable membrane secured next to the exterior wall of the body portion of the microchip element, wherein the device is configured to operate in an aqueous environment and, upon activation of the one or more reservoir caps, release the drug by diffusion through the drug-permeable membrane and into the aqueous environment. In some embodiments, the device further includes an outer housing wall secured in a position next to, and spaced a distance from, the exterior wall of the body portion of the microchip element, the outer housing wall comprising the drug-permeable membrane, wherein a depot space is defined between the drug-permeable membrane and the exterior wall of the body portion of the microchip element, and wherein the drug delivery device is configured to release the drug into the depot space and subsequently diffuse through the drug-permeable membrane and into the aqueous environment. In some other embodiments, the exterior wall is in direct mechanical contact with the drug permeable membrane.

For example, in one embodiment, an implantable drug delivery device is provided which includes a microchip element that includes a body portion defining a plurality of microreservoirs therein, wherein the body portion has an exterior wall having a plurality of drug release apertures in fluid communication with the microreservoirs, the plurality of drug release apertures being closed off by a plurality of corresponding reservoir caps configured to be ruptured by electrothermal ablation to open the drug release apertures; a drug disposed in each of the microreservoirs; a water swellable charge material disposed in each of the microreservoirs; and an outer housing wall secured in a position next to, and spaced a distance from, the exterior wall of the body portion of the microchip element, the outer housing wall including a drug-permeable membrane, wherein a depot space is defined between the drug-permeable membrane and the exterior wall of the body portion of the microchip element. In this embodiment, the device is configured to operate in vivo by permitting interstitial fluid, following activation of one or more of the plurality of reservoir caps, to contact and be imbibed by the water swellable charge material disposed the microreservoirs corresponding to the activated reservoir caps, and thereby cause the charge material to swell and eject the drug out of the microreservoirs through the drug release apertures and into the depot space for subsequent diffusion through the drug-permeable membrane.

In another aspect, a method is provided for controlled drug delivery to a patient. In embodiments, the method includes (i) implanting a drug delivery device into the patient, e.g., subcutaneously; (ii) activating at least one of the one or more reservoir caps to permit interstitial fluid to contact the drug in the containment reservoir corresponding to the activated reservoir cap(s); and (iii) releasing the drug from the device by diffusion of the drug through the drug-permeable membrane. For example, the contacting of the drug in the activated containment reservoir may transfer the drug into a drug depot space and therein form a drug depot, and then the drug diffuses from the device by diffusion from the drug depot through the drug-permeable membrane. The transfer of the drug from the containment reservoir to the drug depot space may comprise swelling of a water swellable charge material to eject the drug from the containment reservoir.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
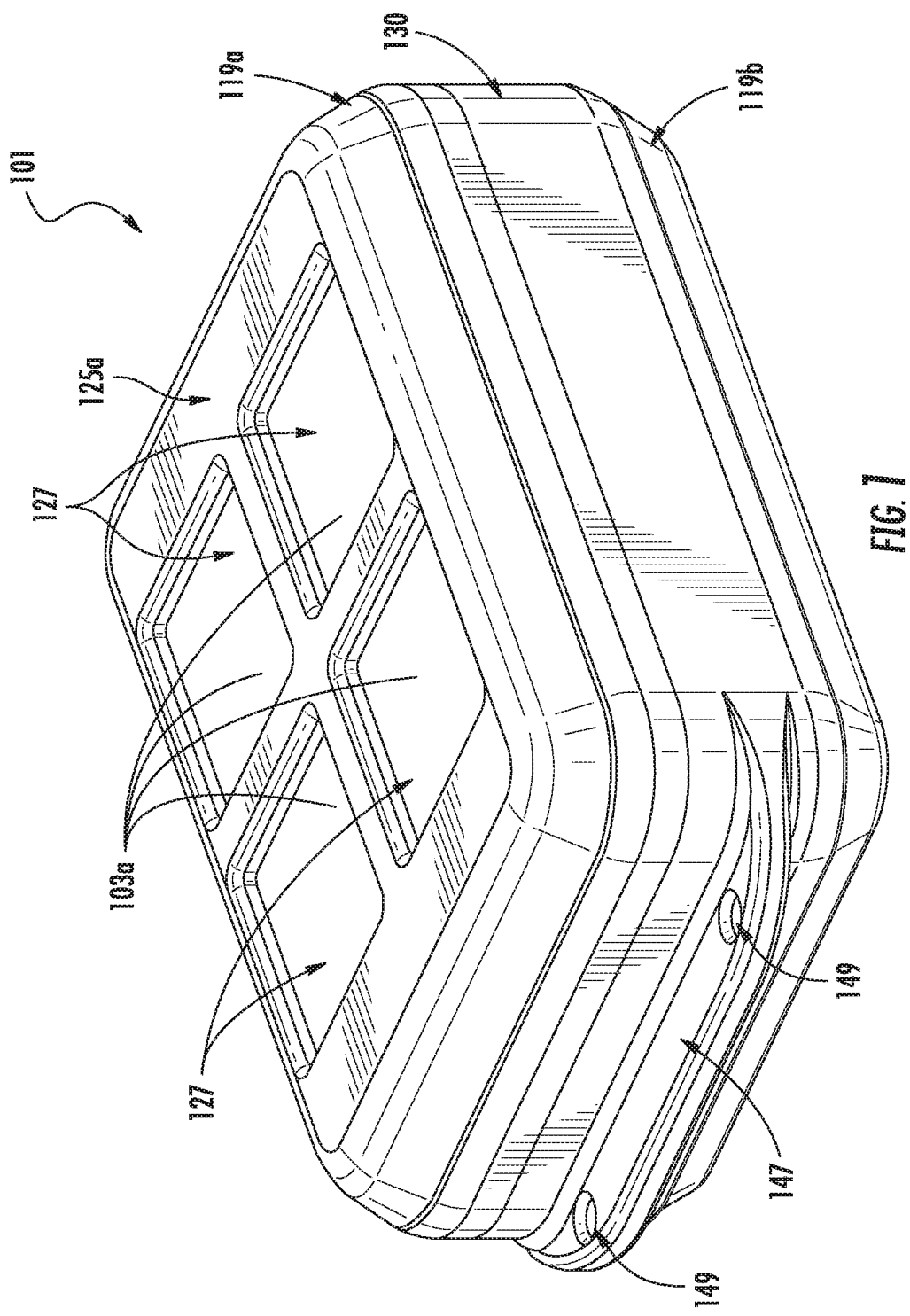
FIG. 1 is a perspective view of a drug delivery device according to one embodiment.

Improved microchip-based drug delivery devices have been developed. In embodiments, the devices advantageously release each dose of drug in two stages. This provides improved drug-release profiles over extended periods, combining the benefits of discrete dosing and continuous dosing, which advantageously enables systemic drug concentrations to remain within a desired therapeutic window for a longer period. In some embodiments, the drug delivery devices described herein provide a nearly linear release of drug over time, e.g., where the amount of drug released from the device is the approximately the same each day during a period of several days, weeks, or longer, in which the device is in use. The device may store and release a single drug or two or more different drugs.

The term "about", as used herein, indicates the value of a given quantity can include quantities ranging within 10% of the stated value, or optionally within 5% of the value, or in some embodiments within 1% of the value.

In embodiments, the drug delivery device includes (i) a microchip element having reservoirs containing drug for controlled release of tens or hundreds of doses of drug over several months or years; (ii) a structure defining an enclosed depot space next to the openings of the drug reservoirs; and (iii) a drug permeable membrane for controlling release of drug from the depot space. The drug permeable membrane may be part of a structure cooperating with the microchip element to define/bound the depot space. With these components, a dose of drug is released, in a first stage, from an activated reservoir and into the depot space, and then the dose of drug is released, in a second stage, from the depot space into the patient. In the first stage, drug release may be driven by diffusion and/or by swelling of an excipient material in the reservoir to displace the drug from the reservoir. In the second stage, drug release may be driven/controlled by diffusion of the drug through the drug permeable membrane. The membrane advantageously serves to slow and extend release from the bolus released into the depot space. In a preferred embodiment, a further benefit of this two stage system is that extended, controlled release does not depend of the use of bioerodible or biodegradable matrix material.

In some alternative embodiments, the drug permeable membrane is adjacent to the microchip element such that there is no gap or predefined depot space between these components. For example, the exterior wall of the microchip element may be in direct mechanical contact with the drug permeable membrane. It is still a two-stage release system, wherein, in a first stage, a drug formulation in the reservoir is permitted to imbibe water following reservoir cap activation, and then the drug, in a second stage, diffuses through the drug permeable membrane and into the patient. The first stage optionally may include an extrusion mechanism, as described below, in which some of the wetted drug formulation (e.g., one including a water swellable material) is forced out of the reservoir and in between the outer surface of the microchip element and the drug permeable membrane, as and if permitted by elastic deformation of the drug permeable membrane.

In one embodiment, the drug delivery device includes a microchip element which includes a body portion defining at least one containment reservoir therein. In a preferred embodiment, the body portion of the microchip element defines an array of discrete containment reservoirs, which may be microreservoirs. In embodiments, the body portion has an exterior wall having one or more drug release apertures in fluid communication with the one or more containment reservoirs. The one or more drug release apertures initially are closed off by one or more corresponding reservoir caps, which are configured to be (electrically, chemically, or mechanically) activated to unclose the one or more drug release apertures. In a preferred embodiment, the reservoir caps are configured to be ruptured by electrothermal ablation, as known in the art. A drug formulation which comprises a drug is initially disposed in each of the one or more containment reservoirs. In this embodiment, the device further includes an outer housing wall secured in a position next to, and spaced a distance from, the exterior wall of the body portion of the microchip element, wherein the outer housing wall includes a drug-permeable membrane, and a depot space is defined between the drug-permeable membrane and the exterior wall of the body portion of the microchip element.

In some embodiments, the device is configured to operate in vivo by permitting interstitial fluid, following activation of one or more of the plurality of reservoir caps, to contact the drug formulation in the reservoir corresponding to the activated reservoir cap(s) and to facilitate transfer of the drug out of the reservoir through the drug release apertures and into the depot space for subsequent diffusion through the drug-permeable membrane. In some embodiments, the drug formulation is a solid form, e.g., as a lyophilized powder or a solid tablet, and the interstitial fluid contacts and solubilizes the drug formulation, so that the drug can diffuse out of the reservoir and into the depot space. In some embodiments, the reservoir further includes a water-swellable material, which swells upon contact with the interstitial fluid, causing the drug to be extruded (pushed out) of the reservoir into the depot space. (The process is sometime referred to herein as an "extrusion mechanism".) This may occur before and/or simultaneously with solubilization of the drug. The water-swellable material may be provided in a form and position separate from the drug formulation, e.g., in layer adjacent to the drug formulation and distal to release aperture.

Drug, Drug Formulation, and Other Reservoir Contents

The drug delivery devices described herein can be used to delivery any suitable drug. As used herein, the term "drug" includes prophylactic or therapeutic agents, and may be used interchangeably with "active pharmaceutical ingredient" or "API" as those terms are known in the art. Non-limiting examples of drugs include hormones, anti-infectives, anti-neoplastics, biologicals, cardiovascular agents, central nervous system agents, immunologic agents, metabolic agents, immunomodulators, and pyschotherapeutic agents. In one embodiment, the drug is an incretin memetic, such as exenatide.

Non-limiting examples of hormones include sex hormones, contraceptives, growth hormones, growth hormone receptor blockers, 5α-reductase inhibitors, adrenal cortical steroids, adrenal corticosteroid inhibitors, somatostatins, parathyroid hormone, and thyroid drugs, and suitable analogs thereof. The hormone may be derived from an animal or may be synthetically created. The hormone may be related to the reproductive system. For example, the drug included in the present drug delivery devices may be a contraceptive hormone. In some embodiments, the drug may include levonorgestrel, testosterone, estradiol, estrone, estriol, progesterone, or metabolites or variants thereof.

The term "drug formulation" as used herein refers to the drug form loaded into the reservoirs of the microchip element. It may consist solely of the drug, or it may further include one or more pharmaceutically acceptable excipients. In a preferred embodiment, the drug formulation is in a dry solid form. For example, the dry solid form may be a powder, granules, or tablets (e.g., microtablets). In other embodiments, the drug formulation may be in the form of a liquid, a solution, a suspension, a gel, or a paste. In one case, the drug formulation is a nanoparticle drug formulation. As used herein, a "nanoparticle drug formulation" refers to a drug formulation where the drug is provided in particles which have an average diameter of from about 1 nm to about 100 nm.

The drug particle size is important for the extrusion mechanism in which the drug is transferred from the reservoirs into the depot space. The particle size may be specific to each active pharmaceutical ingredient selected for delivery. The particles need to be smaller than the drug release aperture, or opening, from the reservoir. In some embodiments, the drug release aperture has a diameter of about 100 microns. In some embodiments with the extrusion mechanism, the drug particle size ranges from about 1 micron to about 40 microns, with a median size of about 5 to 12 microns. In some other embodiments with the extrusion mechanism, the drug particle size is smaller than 1 micron. For example, the drug particles may be nanoparticles, e.g., having a size range from 25 nm to 950 nm, from 50 nm to 800 nm, or from 50 nm to 200 nm.

In some embodiments, the microchip element is configured to release a single drug. In other embodiments, the microchip element is configured to release two or more different drugs. The release of the two or more drugs may be simultaneous, sequential, or in an overlapping combination thereof. In one case, the two or more different drugs may be combined into one drug formulation in each reservoir in an array of the reservoirs in a microchip element. In another case, one of the two or more drugs is formulated in first drug formulation, which is loaded into a first subset of reservoirs in an array of device reservoirs, and a second of the two or more drugs is formulated in second drug formulation, which is loaded into a second subset of reservoirs (not overlapping with the first subset) in the array of device reservoirs.

As mentioned above, the reservoirs of the microchip element may further include a water-swellable material, which is configured to swell upon contact with a biological fluid in vivo (following opening of the reservoir in vivo) to thereby cause the drug to be displaced out of the reservoir into the depot space. In a preferred embodiment, the biological fluid is interstitial fluid. As used herein, "water swellable material" refers to a biocompatible material which swells in water, such as hygroscopic materials, hydrogels, and superabsorbers, as known in the art. Non-limiting examples of water swellable materials include hydrophilic polymers and polymeric networks such as poly(acrylic acid), poly(acrylic acid-co-acrylamide), poly(2-hydroxyethyl methacrylate), poly(2-hydroxypropyl methacrylate), poly(isobutylene-co-maleic acid), carbopol, hydroxypropyl methylcellulose, polyethylene oxide, and hyaluronic acid.

In one embodiment, the water swellable material is in the form of a charge layer adjacent to a layer of the drug formulation, wherein the drug formulation layer is disposed between the charge layer and the one or more drug release apertures of the reservoir in which the drug formulation layer and charge layer are disposed. In one case, the charge layer and drug formulation layer are part of the same tablet or microtablet, which formed and then loaded into the reservoir of the microchip element. In another case, the charge layer and drug formulation layer are produced and/or loaded in the reservoir of the microchip element in sequential steps.

In another embodiment, the water swellable material is combined with the drug formulation. For example, the water swellable charge material may be dispersed with the drug in the drug formulation, e.g., as a powder mixture or mixed with the drug in a microtablet. In another example, the water swellable material may be in the form of a coating on tablets or granules of drug.

In such embodiments, it has been found that certain parameters are particularly important to the efficient operation of the extrusion mechanism. These include (1) the density and dimensions of the microtablet, and (2) the ratio of the drug particles to the swelling agent. In a preferred embodiment, each reservoir is filled with a microtablet, which is a mixture of drug particles and swelling agent. The microtablet properties of density and height may be tuned. Ranges of these properties have been tested. In some embodiments (for example with a formulation comprising levonorgestrel and hyaluronic acid), the density of the microtablet ranges from 1 to 1.3 $mg/mm^3$, and the height of the microtablet ranges from 0.67 mm to 0.95 mm. In some other embodiments, the density may be outside of these ranges, for example, if the particular materials of the composition have a higher or lower achievable density, and if a different height is selected for use in reservoir design having different dimensions. The ratio of the drug particles to the swelling agent is selected to provide swelling agent in an amount effective to both (i) swell the mixture to a volume that greatly exceeds the volume of the reservoir, to thereby extrude as much of the reservoir contents from the reservoir as possible, and (ii) maintain separation/dispersion of the drug particles so that they cannot agglomerate and block the apertures. Various ratios have been tested, including microtablet compositions up to 65% drug, with the balance being swelling agent or other excipients. It was found (for example with a formulation comprising levonorgestrel and hyaluronic acid) that the highest extrusion efficiency was obtained with 42% drug or less, by weight. The extrusion efficiency, however, must be balanced against the amount of drug released for therapeutic efficacy. Therefore, in some preferred embodiments, the composition of the microtablet is from about 10% to about 50% drug particles, e.g., about 20% to about 45% drug particles, about 30% to about 42%, by weight, with the balance being excipients including swelling agent. In other embodiments, for example with other formulations, the preferred amounts may be outside of these ranges.

Microchip Element Body and Reservoir Caps

The microchip element includes a body portion defining the one or more containment reservoirs. The containment reservoirs may simply be referred to herein as "reservoirs." In some embodiments, the microchip element is one known in the art, for example, as described in U.S. Pat. No. 8,403,915 to Santini et al., U.S. Pat. Pub. No. 2013/0053671 to Farra, and U.S. Pat. Pub. No. 2014/0243624 to Farra, U.S. Pat. Pub. No. 2016/0354780 to Farra, each of which is hereby incorporated by reference. In a preferred embodiment, the microchip element includes an array of discrete reservoirs and is composed of two substrate portions bonded together to hermetically seal each reservoir after the drug formulation is loaded into the reservoirs of the array. In some embodiments, the two substrate portions include a sealing chip and reservoir chip. Non-limiting examples of the sealing chips and reservoir chips forming the body portion and reservoirs of the microchip element are shown in FIGS. 5, 6, 7, 8, and 9, and described below. Reservoir caps closing off the drug release apertures in an exterior wall of the microchip element are also illustrated.

In some embodiments, the drug delivery device described herein includes a single microchip element. In some other embodiments, the drug delivery device described herein includes two or more microchip elements. In a preferred embodiment, the drug delivery device includes two microchip elements, wherein the exterior walls of the microchip elements are on opposite sides of the device, such that release of the drug from each microchip element is in a direction opposite from the other. In another embodiment, there are two microchip elements on either side but placed in direct opposition to each other without other elements of the device (i.e. electronic components, hermetic enclosure) in between.

The reservoirs of the microchip element each include one or more drug apertures. In a preferred embodiment, these apertures are (initially) closed off by reservoir caps, which are configured to be activated to unclose the drug release apertures. Such reservoir cap activation can occur by various electrical, mechanical, and/or chemical means known in the art, for example, as described in U.S. Pat. No. 7,070,590 to Santini et al., U.S. Pat. No. 6,527,762 to Santini et al., U.S. Pat. No. 6,491,666 to Santini et al., U.S. Pat. No. 7,604,628 to Santini et al., and U.S. Pat. No. 7,455,667 to Uhland et al., which are hereby incorporated by reference herein in pertinent part. In a preferred embodiment, the reservoir caps are configured to be activated by electrothermal ablation, as described in U.S. Pat. No. 7,455,667 to Uhland et al. In such a case, the reservoir caps are consist of, or include, an electrically conductive material, such as a thin metal film (e.g., gold), and the drug delivery device is configured to apply an electrical current through the reservoir cap(s) of the reservoir to be opened, through an electrical input lead and an electrical output lead, which are each electrically connected to each reservoir cap, to rupture the reservoir cap.

In a preferred embodiment, the reservoirs of the microchip element are microreservoirs. As used herein, the term "microreservoir" refers to a reservoir having a volume equal to or less than 500 µL (e.g., less than 250 µL, less than 100 µL, less than 50 µL, less than 25 µL, less than 10 µL, etc.). In another embodiment, the containment reservoirs is a "macroreservoir" which generally refers to a reservoir having a volume greater than 500 µL (e.g., greater than 600 µL, greater than 750 µL, greater than 900 µL, greater than 1 mL, etc.) and less than 5 mL (e.g., less than 4 mL, less than 3 mL, less than 2 mL, less than 1 mL, etc.). The terms "reservoir" and "containment reservoir" are intended to encompass both microreservoirs and macroreservoirs unless explicitly indicated to be limited to either one or the other.

Outer Housing Wall, Drug-Permeable Membrane, and Depot Space

In embodiments, the drug delivery device includes an outer housing wall that includes one or more drug-permeable membranes. In a preferred embodiment, the outer housing wall is spaced apart from the exterior wall of the body portion of the microchip element to form therebetween, a depot space. That is, the depot space is defined between the drug-permeable membrane(s) and the exterior of the microchip element that has the drug release openings/reservoir caps. In a preferred embodiment, the outer housing wall is part of a rigid shell structure that frames and/or supports the one or more drug-permeable membranes. The shell structure may further include a housing ring on this sides generally perpendicular to the sides with the drug-permeable membrane. In various embodiments, the outer housing wall includes one, two, three, four, or more windows, wherein each window frames a drug-permeable membrane. If there are two or more windows, then each window may have its own drug-permeable membrane or may frame a portion of a single drug-permeable membrane.

The outer wall and the shell structure are made of a biocompatible material that has suitable mechanical properties and is suitable for long term implantation in a patient. Typically, the rigid components are made of a biocompatible metal or alloy, such as a stainless steel or titanium. In some embodiments, the shell of the drug delivery device has a maximum dimension in any direction from about 10 mm to about 50 mm.

The drug-permeable membrane may be any suitable biocompatible material that is able to provide the desired controlled release rate of a selected drug. The drug-permeable membrane may be a biocompatible polymeric membrane. In a preferred embodiment, the membrane is an elastomeric material, such as a silicone or polyurethane. In embodiments, the drug-permeable is water-permeable, so that when the drug delivery device is in an aqueous environment, e.g., following in vivo implantation, water (from/ or the biological fluid, e.g., interstitial fluid) may diffuse through the drug-permeable membrane and into the depot space, and then, at least in some embodiments, into the opened drug containment reservoir. In some embodiments, the drug permeable membrane may be non-porous, such that drug release is controlled by trans-wall diffusion through the membrane. In some other embodiments the drug permeable membrane includes pores, such that drug release is controlled by diffusion through the passing pores in the membrane.

The rate of diffusion of drug through the drug-permeable membrane may be controlled, in part, by the thickness of the membrane, the surface area of the membrane exposed to the drug, and the distance or "gap" from the membrane to the surface of the reservoir caps. In some embodiments, the drug-permeable membrane has a thickness from about 100 µm to about 1000 µm, for example from about 200 µm to about 600 µm, or from about 250 µm to about 500 µm. In some embodiments, the drug-permeable membrane is silicone and has a thickness from about 300 µm to about 500 µm, e.g., from about 350 µm to about 400 µm. Various membrane thicknesses have been tested, including those as thin as 36 microns and as thick as 650 microns. In one preferred embodiment, the membrane thickness is nominally 70 microns (measured at 72 microns).

The rate is also controlled in part by the total surface area of the membrane, along with the thickness and composition of the material (e.g., the particular grade of the silicone material). In one embodiment, the required drug delivery rate is achieved with a silicone membrane and device design which utilizes 200 $mm^2$ of surface area with 72 micron thickness. In other embodiments, one or more of the material of construction, the thickness, and the surface area may differ.

In an alternative embodiment, there is essentially no gap between the membrane and the reservoir caps of the microchip element. For example, the outer surface of the device, including but not limited to the reservoir cap-comprising face of the microchip elements, may be partially or fully encapsulated by the membrane.

Other Device/System Components

In embodiments, the drug delivery devices further include electronics for controlling and powering reservoir activation and for wireless transmission of power and/or data to/from the device. In some embodiments, the electrical component providing these functions are included in/on one or more printed circuit boards (PCBs), and/or are incorporated into one or more of the chips of the microchip element, as described in U.S. Pat. Pub. No. 2013/0053671 to Farra and U.S. Pat. Pub. No. 2014/0243624 to Farra, which are incorporated herein by reference. In some embodiments, the drug delivery device includes two PCBs comprising a hermetic material, such as alumina or silicon nitride n certain embodiments, which are arranged to define a hermetic enclosure containing the electronic components therebetween. As used herein, the term "hermetic" refers to preventing undesirable ingress or egress of chemicals (e.g., water vapor, water, oxygen, etc.) over the useful life of the device. For purposes herein, a material/seal that transmits helium (He) at a rate less than $1 \times 10-9$ atm*cc/sec is termed hermetic. In one case, the distal sides of these PCBs (outside of the hermetic enclosure) each are connected to a microchip element of the device.

Methods of Using the Drug Delivery Device

The devices described herein may be used to provide controlled administration of a drug to a patient in need thereof. The term "patient" refers to a human or other mammalian subject. In various embodiments, the devices may be adapted for use in humans, whether male or female, adult or child, or for use in animals, such as for veterinary or livestock applications.

In some embodiments, the method of controlled drug delivery to a patient includes (i) implanting a drug delivery device as described herein into the patient at an implant location in the patient's body; and then (ii) activating the one or more reservoir caps of a first selected reservoir or subset of reservoirs to open those reservoirs of the microchip element. When the device is implanted at the implant location, interstitial fluid from tissue at the implant location diffuses into and fills the depot space. Once the reservoir(s) is/are opened, the interstitial fluid in the depot space enters the reservoir(s) to contact the drug formulation and the water swellable material, if any, contained therein. In turn, this causes the drug to be transferred into the drug depot space and therein form a drug depot (the first stage of drug release), which may be in the form of a mass disposed on the exterior surface of the microchip element. This transfer may be driven by diffusion, extrusion (positive displacement) caused by swelling of the water swellable material if present, or a combination thereof. In one case, the transfer of the drug from the containment reservoir to the drug depot space includes swelling of a water swellable charge material to eject the drug from the containment reservoir. Next, the drug in the drug depot diffuses through the drug-permeable membrane (the second stage of drug release), exiting the device entering and into the patient's body, where it can diffuse into the vasculature for systemic delivery. At a later time, step (ii) is repeated, activating the one or more reservoir caps of a second selected reservoir or subset of reservoirs to open those reservoirs of the microchip element. This later time may be selected to replenish the drug in the depot space before the second stage release rate falls to sub-therapeutic levels as the depot is depleted.

In embodiments, the device is configured to release doses of drug from the reservoirs at spaced intervals over an extended period of several months or years. In some embodiments, the implanted device can be controlled wirelessly, which may include reversibly turning the device off and on as needed, activating drug release on demand, re-programming a drug release schedule, and/or collecting data, if any, sensed/recorded by the implanted device.

The drug delivery devices can be used to treat or prevent a wide range of diseases or conditions, depending on the particular drug or drug combination administered using the device. Non-limiting examples include reproductive health applications, including contraception.

In one embodiment, the time period between reservoir activations is pre-determined, e.g., based on a programmed schedule. In another embodiment, the time period between reservoir activations is based on a measured in vivo drug concentration (e.g., plasma drug level) or another sensed value or condition in the patient. In such embodiments, the sensor used to measure the drug concentration or other biometric parameter may be part of the implantable drug delivery device or it may be part of a separate device, either implanted in or external to the patient.

The implanting step (i) may include making a small incision in the patient's skin and inserting the drug delivery device at a suitable subcutaneous tissue site. In some minimally-invasive forms of the device, it may be inserted or injected into a tissue site in the patient using a cannula, trocar, or other minimally invasive medical instrument. In other embodiments, the implanting step may include implanting the device into another suitable tissue site in the patient, such as an intraperitoneal space. Other tissue sites are envisioned, and the choice may depend, for example, on the treatment the patient needs, the drug, whether local or systemic administration of the drug is desired.

Illustrative Embodiments

Figure 2:
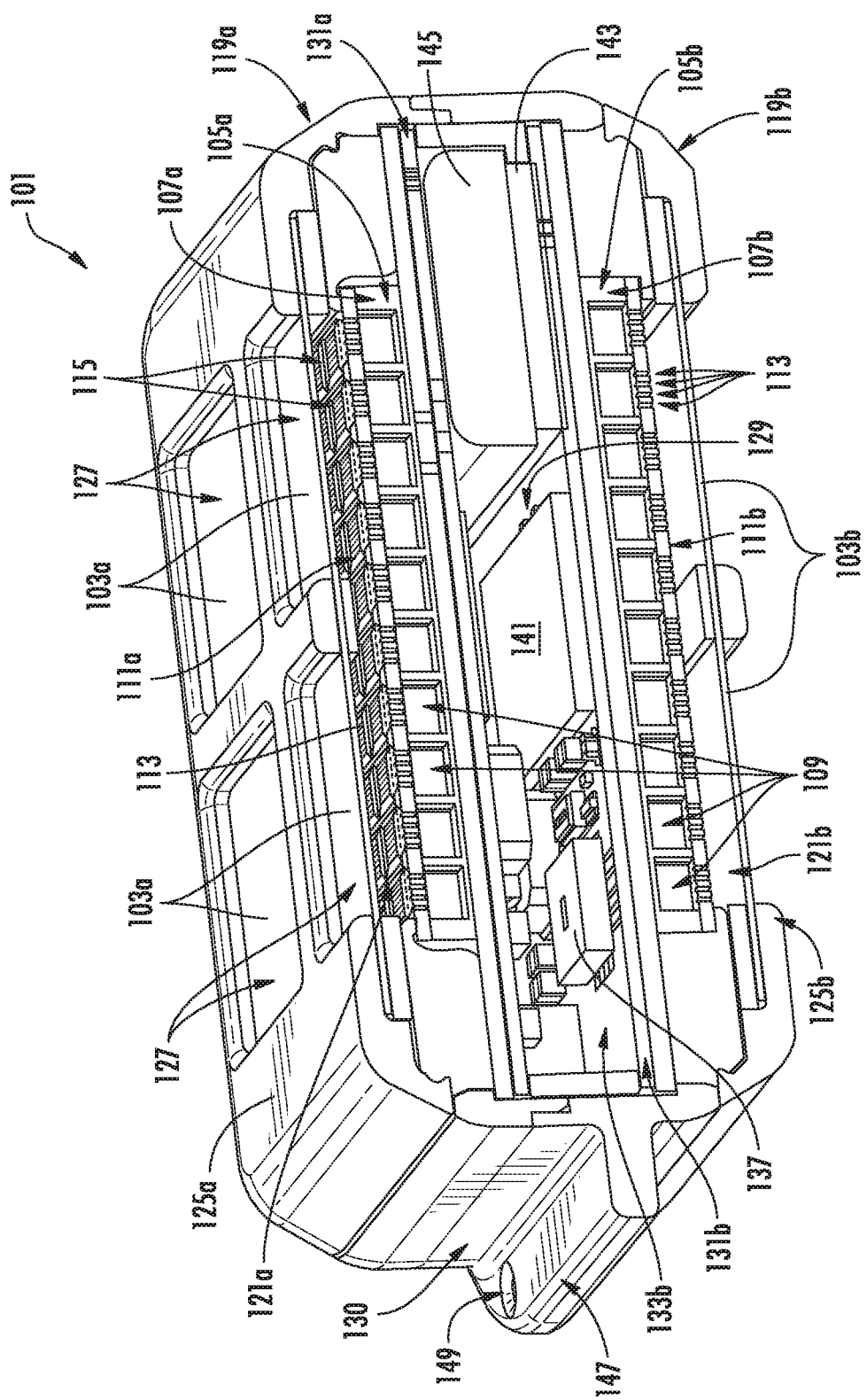
FIG. 2 is a cross-sectional, perspective view of the drug delivery device of FIG. 1.

One embodiment of a drug delivery device as described above is shown in FIGS. 1 and 2. FIG. 1 shows the exterior of the device in one perspective, and FIG. 2 shows in a cut-away view showing the interior of the device in another perspective. The drug delivery device 101 includes a first outer housing wall 119a, a second outer housing wall 119b, and a housing ring 130. The first outer housing wall 119a, second outer housing wall 119b, and housing ring 130 are secured together to form a device shell, with the parts having a hermetical seal between them. In one embodiment, the parts of the shell are metal and fused together by a welding process, e.g., laser welding or brazing, as known in the art. As shown, the housing ring 130 includes an optional projecting edge 147 extending perpendicularly from the housing ring 130, away from the drug delivery device 101. The projecting edge 147 includes holes 149 suitable for use in suturing the device to nearby tissue, to secure the device in place within an implant site in a patient. The first and second outer housing walls 119a, 119b each include a rigid frame 125a, 125b, respectively, which supports a drug-permeable membrane 103a, 103b, respectively. As shown in FIG. 1, the rigid frame 125a defines/surrounds the periphery of four windows 127 of the drug permeable membrane 103a. As shown in FIG. 2, the first and second outer housing walls 119a, 119b and the housing ring 130 cover microchip elements 105a, 105b, such that the only access between the outside of the drug delivery device 101 and the microchip element is through the windows 127 of the drug permeable membranes 103a, 103b.

Figure 2A:
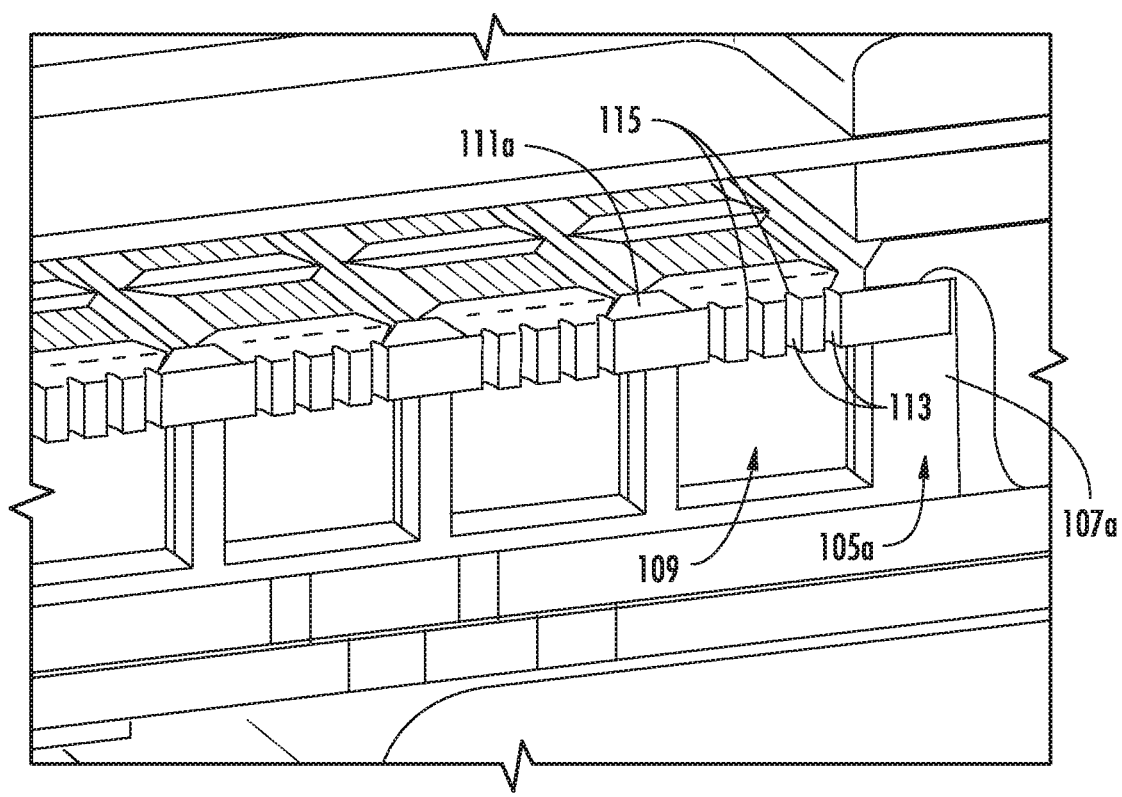
FIG. 2A is a close-up of a portion of the drug delivery device shown in FIG. 2.

The first microchip element 105a has a body portion 107a, and the second microchip element 105b having a body portion 107b. Each of the body portions 107a and 107b defines an array of containment reservoirs 109. Each of the body portions 107a and 107b has an exterior wall 111a and 111b, respectively. As can be seen in FIG. 2, each of the first and second drug permeable membranes 103a, 103b is secured in a position next to, and spaced a distance from, the exterior wall 111a, 111b, respectively. In this arrangement, a first depot space 121a is created between the exterior wall 111a and the microchip element 105a, and a second depot space 121b is created between the exterior wall 111b and the microchip element 105b. In this way, drug exiting reservoirs 109 of microchip element 105a through drug release apertures 113 will enter first depot space 121a, and drug exiting reservoirs 109 of microchip element 105b through drug release apertures 113 will enter first depot space 121b. As shown in FIG. 2A, each containment reservoir 109 includes an array of drug release apertures 113, which are closed off by a corresponding array of reservoir caps 115.

The first and second microchip elements 105a, 105b are respectively fixed onto first and second printed circuit boards (PCBs) 131a, 131b. The first and second PCBs 131a, 131b include substrates 133a, 133b, respectively. The substrates 133a, 133b mechanically support and electrically connect electronic components using conductive pathways, tracks, or signal traces as known in the art. The first and second PCBs 131a and 131b may include a biocompatible and hermetic substrate material, such as alumina or silicon nitride. The first and second PCBs 131a, 131b combined with the housing ring 130 form a hermetic enclosure 129.

A number of electronic components are fixed to one or both of the first and second PCBs 131a and 131b and located in the hermetic enclosure 129. The components illustrated in FIG. 3 include battery 145, battery insulator film 167, battery insulator foam 143, capacitors 139, real time clock 137, and ASIC 141.

Figure 3:
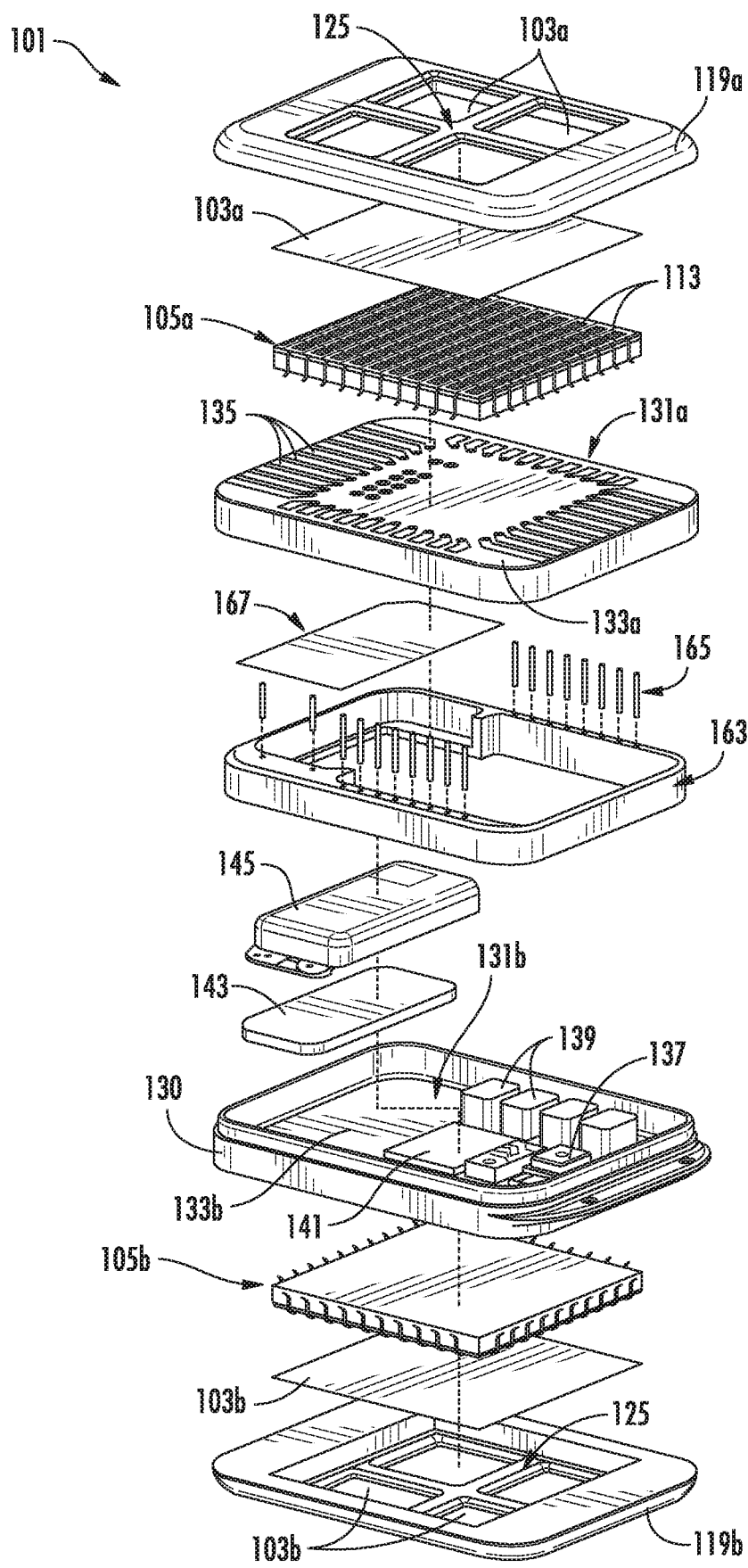
FIG. 3 is an exploded perspective view of the drug delivery device of FIG. 1.
Figure 4:
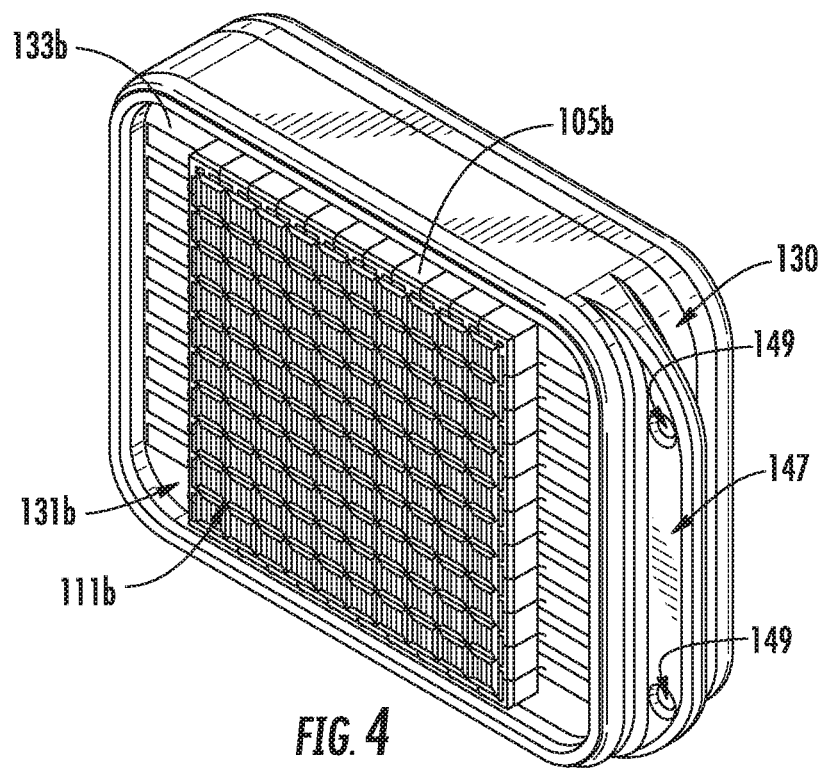
FIG. 4 is a perspective view of a part of the drug delivery device of FIG. 1.

As shown in FIGS. 3 and 4, each of first and second PCBs 131a, 131b include a number of leads 135 on each of the first and second substrate 133a and 133b, respectively. At least some of these leads connect a power source with an input lead and an output lead which are electrically connected to each reservoir cap 115, so that each reservoir cap 115 can be activated by passing an electrical current through the reservoir cap 115, via the input lead and output lead, so that the reservoir cap 115 ruptures (e.g., by electrothermal ablation as described above) to release or expose the contents of the containment reservoir 109.

FIG. 3 shows the first and second outer housing walls 119a, 119b, contact springs 165, the first and second rigid frames 125a, 125b, the first and second drug-permeable membranes 103a, 103b, and the windows 127 of the drug permeable membranes 103a, 103b. FIG. 3 also shows the first and second microchip elements 105a, 105b, separated from the substrates 133a, 133b of the first and second PCBs 131a, 131b.

FIG. 4 shows the drug delivery device of FIG. 1 without the first and second outer housing walls 119a, 119b and without the first and second drug-permeable membranes 103a, 103b. Accordingly, one can see the second PCB 131b onto which microchip element 105b is fixed, with exterior wall 111b of microchip element 105b facing outward.

Figure 5:
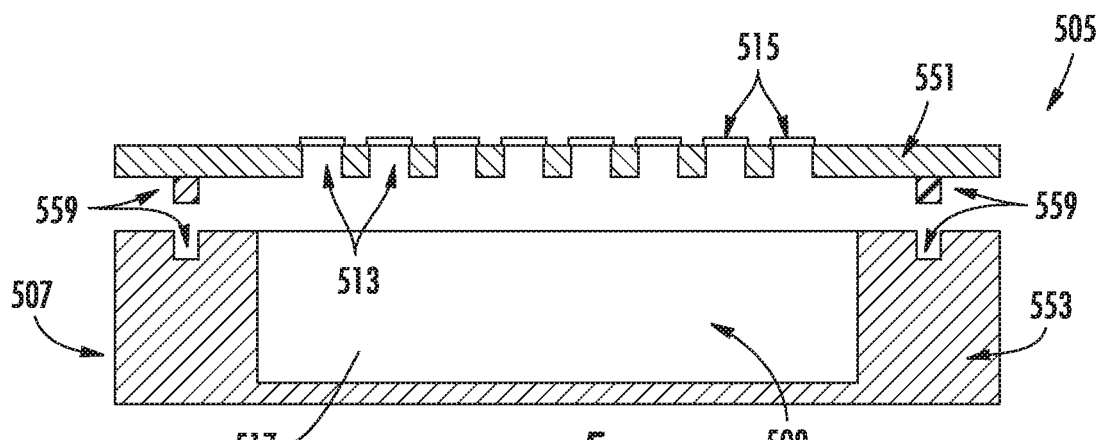
FIG. 5 is a cross-sectional, exploded view of a portion of the microchip element, showing two chip portions that define a single containment reservoir, according to one embodiment. The microchip element would, in preferred embodiments, include a plurality of such containment reservoirs defined in an array within the two chip portions.

FIG. 5 depicts the construction of one embodiment of a microchip element, focusing on a single reservoir. Although not shown, these two structural components shown would extend laterally and repeat to define an array of reservoirs. This microchip element may be used in a drug delivery device as described herein. As shown, microchip element 505 has a body portion 507 that is formed from a sealing chip 551 joined to a reservoir chip 553. Containment reservoir 509 is defined primarily in reservoir chip 553 and closed off by sealing chip 551 after drug formulation 517 is loaded into the reservoir 509. Containment reservoir 509 has straight (substantially non-tapered) sidewalls. The reservoir chip 553 and sealing chip 551 are joined together with sealing structures 559, which may consist of positive and negative mating features (e.g., grooves and ridges), which are bonded together using compression cold welding to hermetically seal the reservoir 509. U.S. Pat. Pub. No. 2016/0354780 to Farra describes compression cold welding to seal microchip elements and is hereby incorporated by reference. The sealing chip 551 includes a plurality of reservoir caps 515 which seal drug release apertures 513. When the reservoir caps 515 are ruptured, water can enter the reservoir 509 and contact the drug formulation 517 and solubilize the drug and permit it to diffuse out of the reservoir 509 through the drug release apertures 513.

Figure 6:
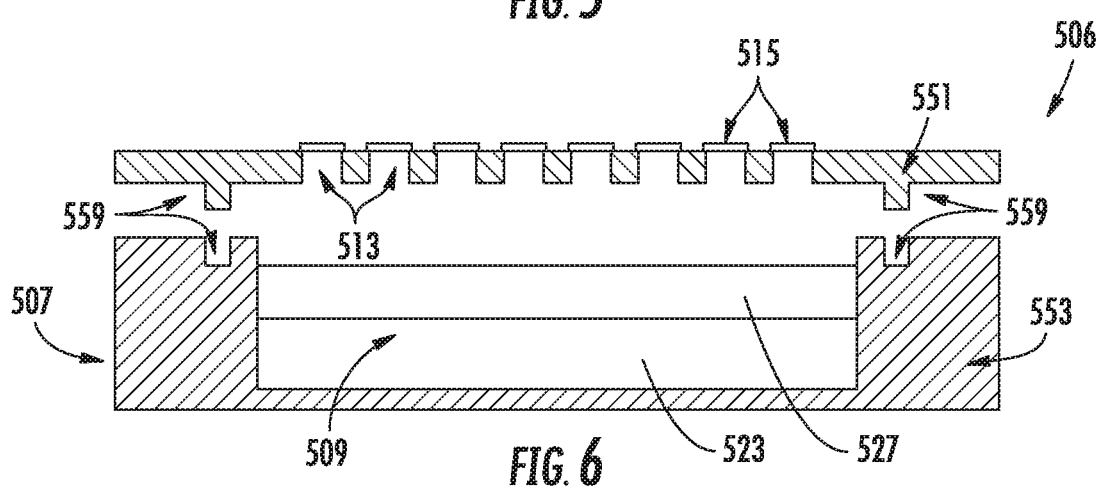
FIG. 6 is a cross-sectional view of the containment reservoir of FIG. 5, according to another embodiment. The microchip element would, in preferred embodiments, include a plurality of such containment reservoirs defined in an array within the two chip portions.

FIG. 6 shows microchip element 506, which is identical to microchip 505 shown in FIG. 5, except instead of drug formulation 517 filling the reservoir 509, the reservoir 509 contains both a drug formulation 527 and a charge layer 523 comprising a water swellable material. The drug formulation is positioned between the drug release apertures 513 and the charge layer 523, so that when the reservoir caps 515 are ruptured, water can enter the reservoir 509 and contact the drug formulation 527 and the charge layer 523, wherein the charge layer imbibes the water and swells to eject the drug formulation 527 out of the reservoir through the drug release apertures 513.

Figure 7:
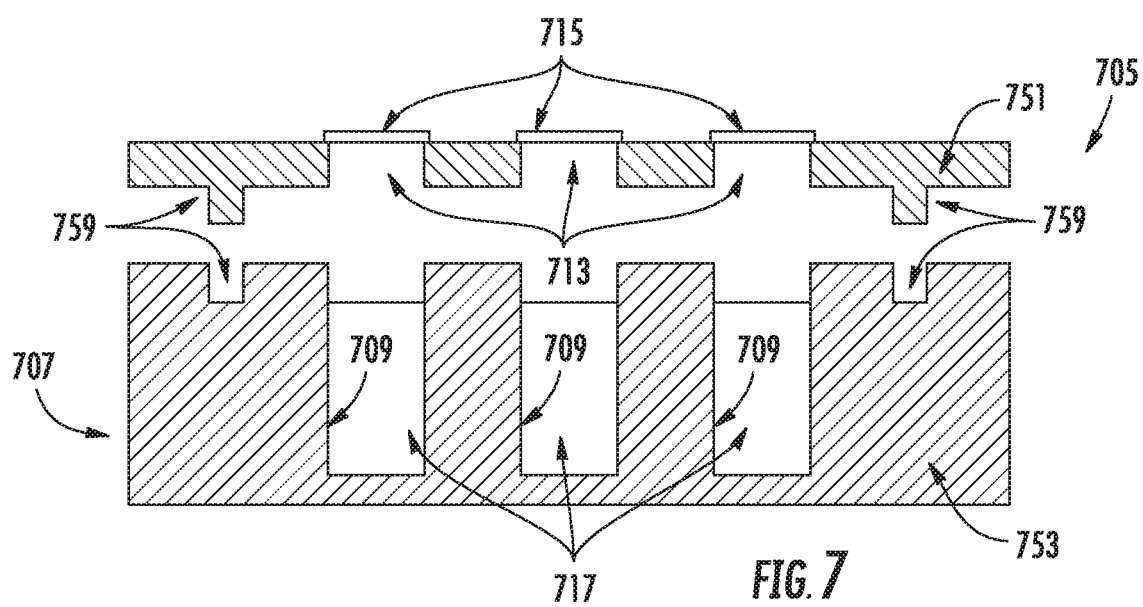
FIG. 7 is a cross-sectional, exploded view of a portion of another embodiment of a microchip element, showing two chip portions that define a plurality of containment reservoirs.
Figure 8:
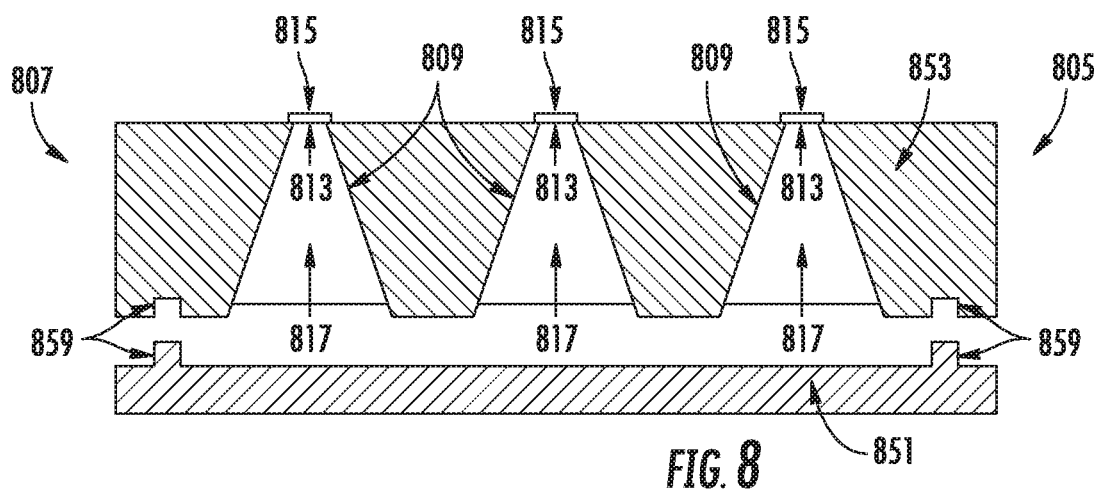
FIG. 8 is a cross-sectional, exploded view of a portion of yet another embodiment of a microchip element, showing two chip portions that define a plurality of containment reservoirs.
Figure 9:
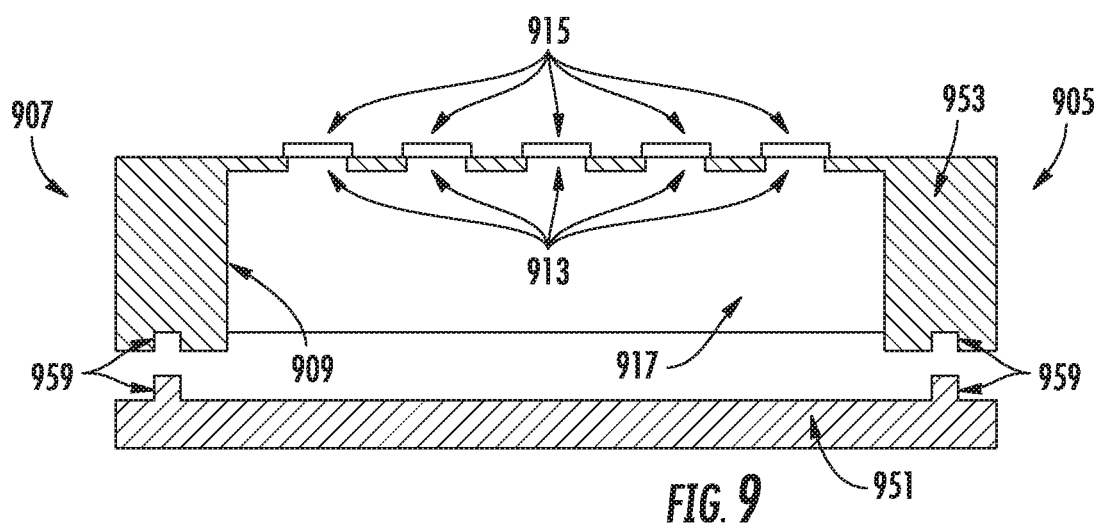
FIG. 9 is a cross-sectional, exploded view of a portion of still another embodiment of a microchip element, showing two chip portions that define a single containment reservoir. The microchip element would, in preferred embodiments, include a plurality of such containment reservoirs defined in an array within the two chip portions.

FIGS. 7-9 illustrate some other possible configurations of the microchips elements. FIG. 7 depicts microchip element 705 which has three containment reservoirs 709 in body portion 707 which is formed from a sealing chip 751 and a reservoir chip 753. The reservoir chip 753 and sealing chip 751 are joined together with sealing structures 759, which may consist of positive and negative mating features (e.g., grooves and ridges), which are bonded together using compression cold welding to hermetically seal the reservoir 709. Reservoirs 709 have straight (substantially non-tapered) sidewalls. The sealing chip 751 includes reservoir caps 715 which each seal corresponding drug release apertures 713. Each containment reservoir 709 contains a drug formulation 717. Although not shown, reservoirs 709 could further include a water swellable material charge layer with the drug formulation 717.

FIG. 8 depicts microchip element 805 which has three containment reservoirs 809 in body portion 807 which is formed from a sealing chip 851 and a reservoir chip 853. The reservoir chip 853 and sealing chip 851 are joined together with sealing structures 859, which may consist of positive and negative mating features (e.g., grooves and ridges), which are bonded together using compression cold welding to hermetically seal the reservoir 809. Reservoirs 709 have tapered sidewalls. In contrast to the embodiments shown in FIGS. 5-7, it is the reservoir chip 853 that includes the drug release apertures 813 and reservoir caps 815. Sealing chip 851 has no apertures or reservoir caps. Each containment reservoir 809 contains a drug formulation 817. Although not shown, reservoirs 809 could further include a water swellable material charge layer with the drug formulation.

Like FIG. 8, FIG. 9 also depicts a microchip element in which the reservoir chip includes drug release apertures and reservoir caps. It shows microchip element 905 which has a containment reservoir 909 in body portion 907 which is formed from a sealing chip 951 and a reservoir chip 953. The reservoir chip 953 and sealing chip 951 are joined together with sealing structures 959, which may consist of positive and negative mating features (e.g., grooves and ridges), which are bonded together using compression cold welding to hermetically seal the reservoir 909. Reservoirs 909 have straight sidewalls. The reservoir chip 953 includes the drug release apertures 913 and reservoir caps 915. Sealing chip 951 has no apertures or reservoir caps. The reservoir 809 contains a drug formulation 817. Although not shown, the reservoir 809 could further include a water swellable material charge layer with the drug formulation.

Figure 10:
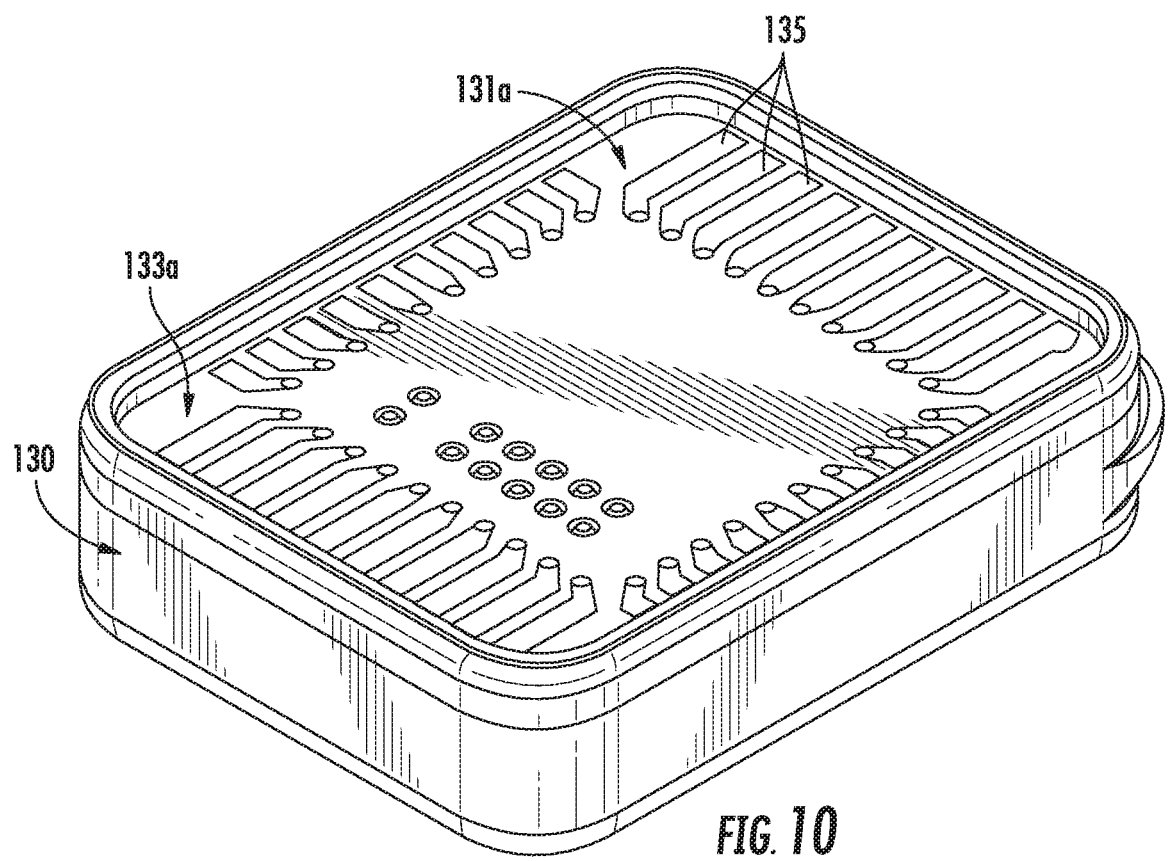
FIG. 10 is an upper perspective view of the central part of the drug delivery device of FIG. 1.
Figure 11:
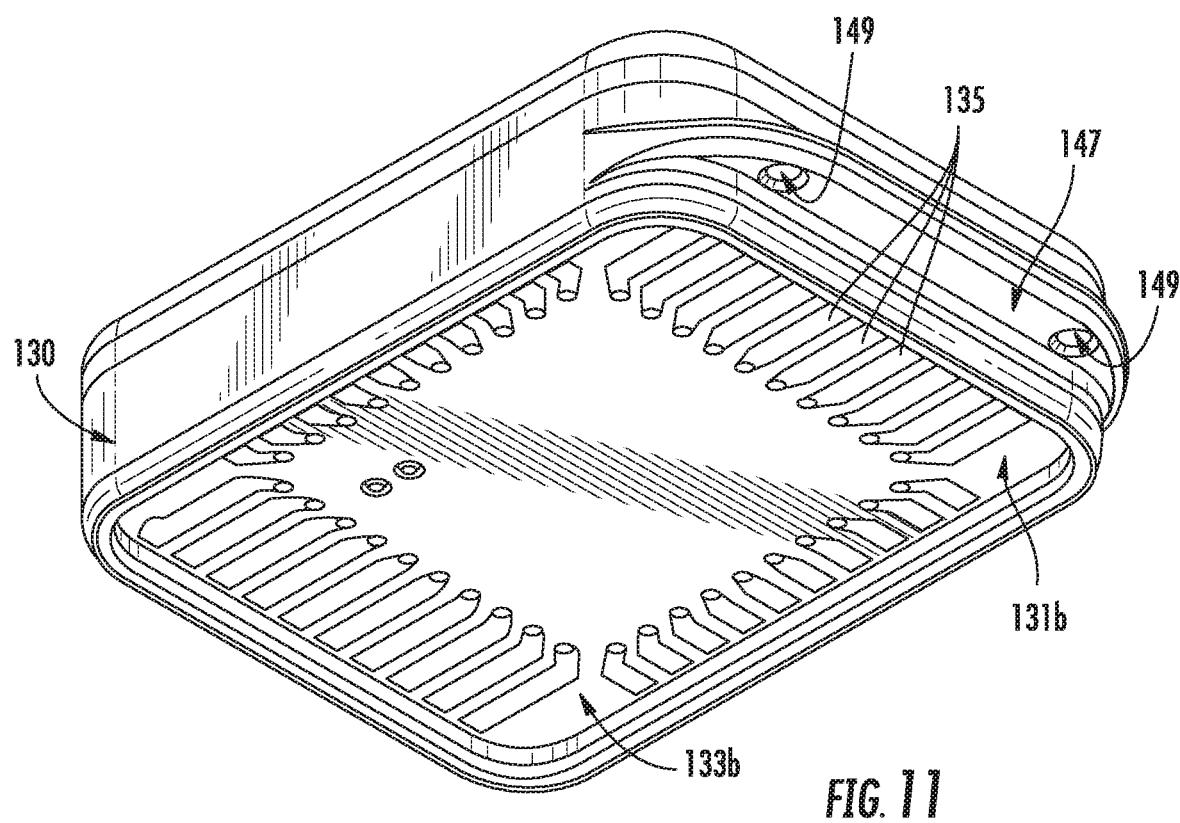
FIG. 11 is a lower perspective view of the central part of the drug delivery device of FIG. 1.

FIGS. 10 and 11 show the drug delivery device of FIG. 1 without the first and second outer housing walls 119a, 119b, without the first and second drug-permeable membranes 103a, 103b, and without the microchip elements 105a, 105b. Accordingly, in FIG. 10, one can see the first PCB 131a which has a substrate 133a with a number of leads 135 disposed thereon, and in FIG. 11, one can see the second PCB 131b which has a substrate 133b with a number of leads 135 disposed thereon.

Figure 12:
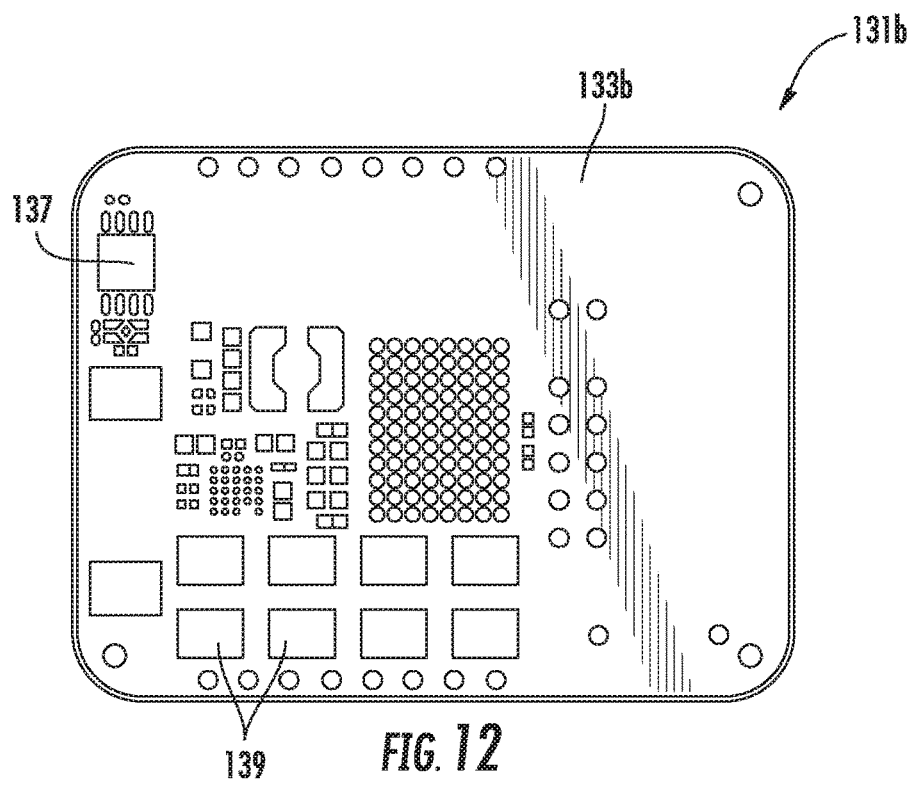
FIG. 12 is an upper view of one embodiment of a printed circuit board in the drug delivery device of FIG. 1.
Figure 13:
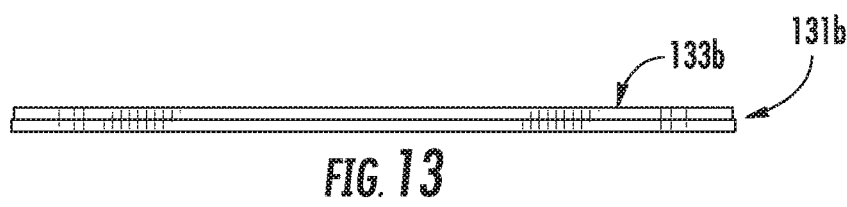
FIG. 13 is a side view of the printed circuit board of FIG. 12.
Figure 14:
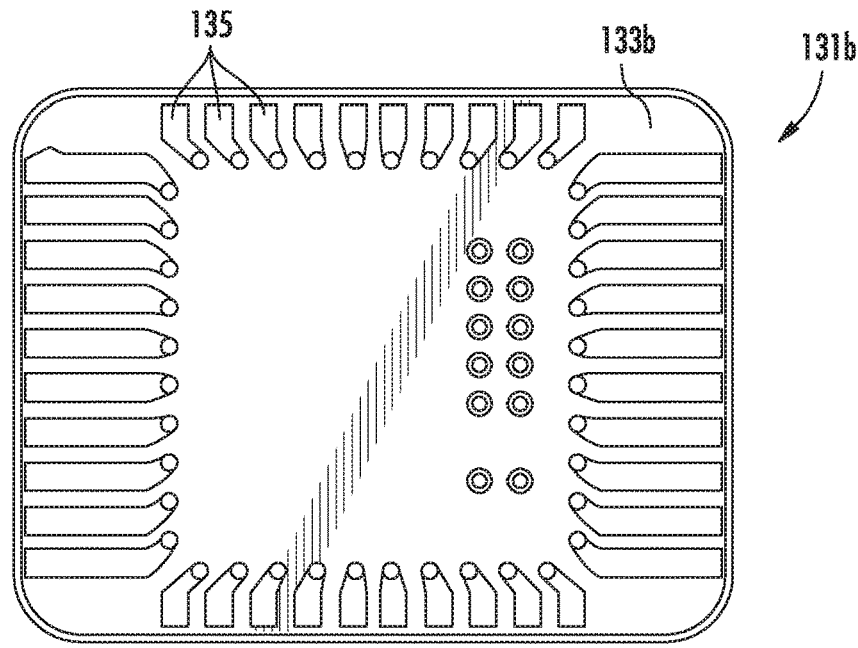
FIG. 14 is a lower view of the printed circuit board of FIG. 12.

FIGS. 12-14 show different views of the second PCB 131b, which includes a substrate 133b, leads 137, various electrical components, and vias for connecting the microchip element 105b to electronic components inside the hermetic enclosure described above.

Figure 15:
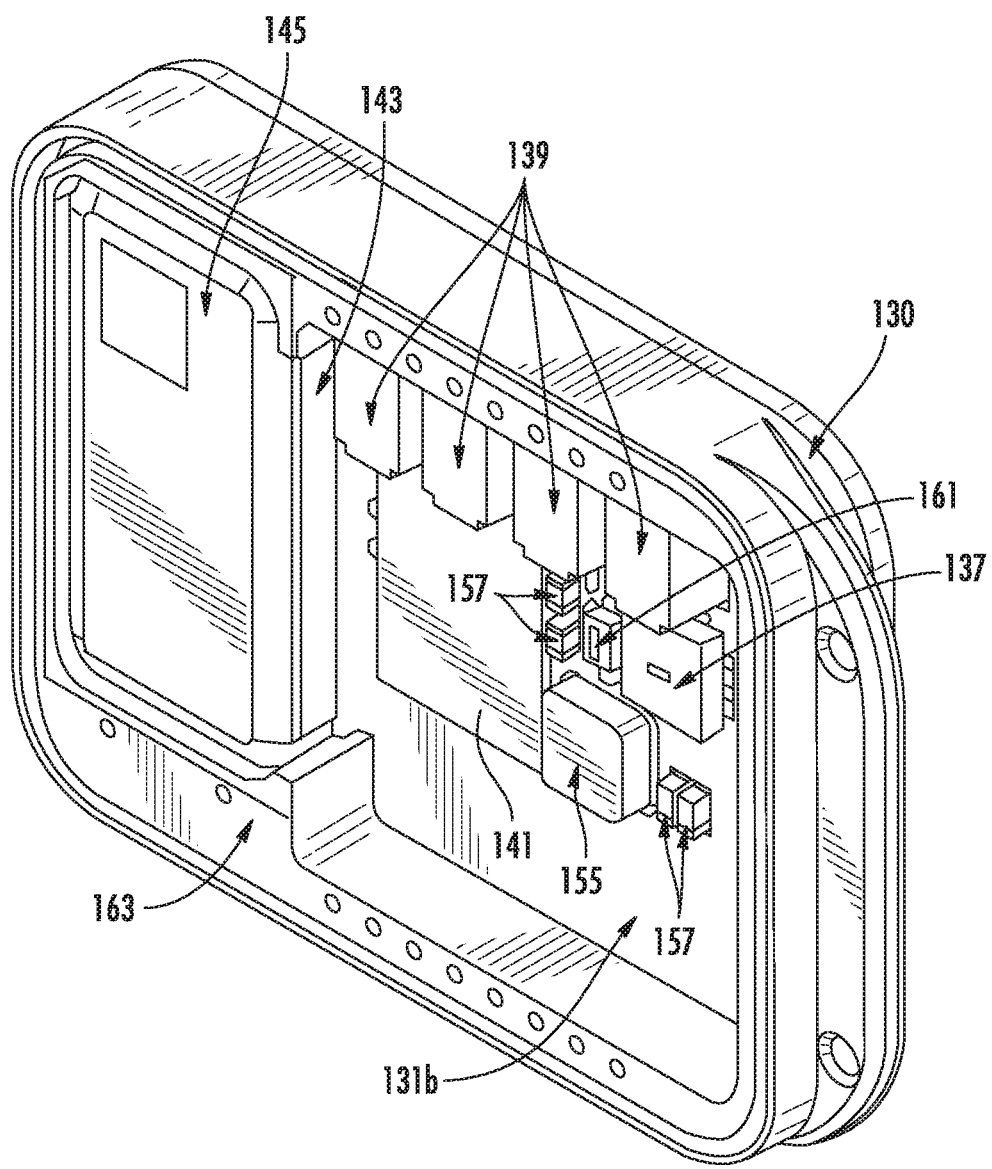
FIG. 15 is a perspective view of another part of the drug delivery device of FIG. 1, showing some of the internal electronics.

FIG. 15 shows a partial assembly of the drug delivery device 101, depicting the housing ring 130, the second PCB 131b, battery 145, and battery/spring nest 163. Other electronic components include capacitors 139, ASIC 141, real time clock (RTC) 137, crystal 161 for the RTC, inductor 155, and various passive components 157 (resistors and capacitors).

Figure 17:
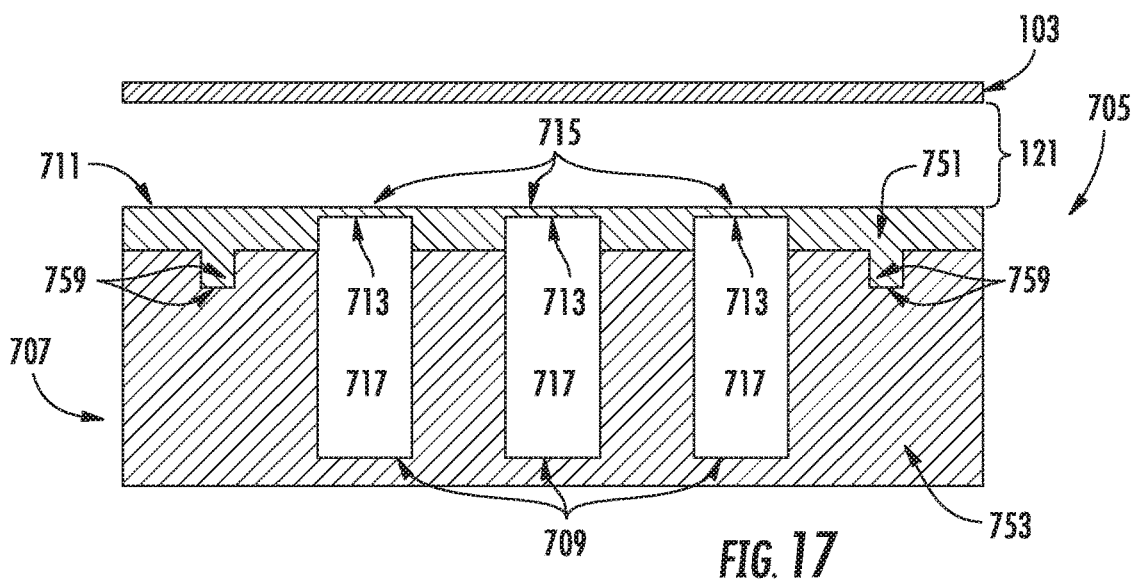
FIGS. 17-19 are cross-sectional views illustrating the two-stage release of drug from a reservoir of a drug delivery device according to one embodiment of the present disclosure.
Figure 18:
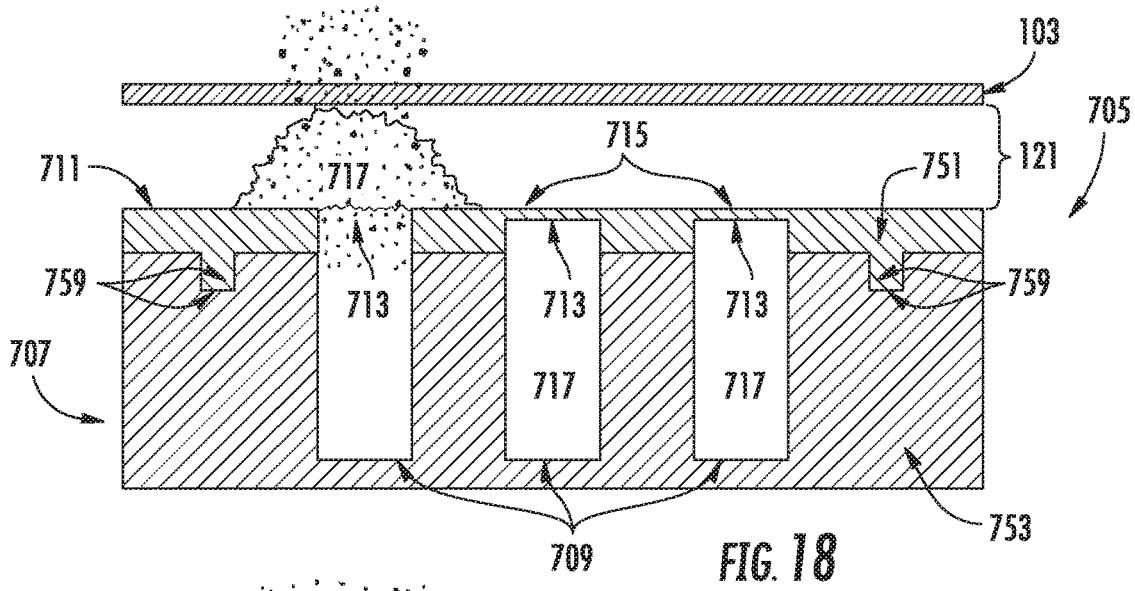
Figure 19:
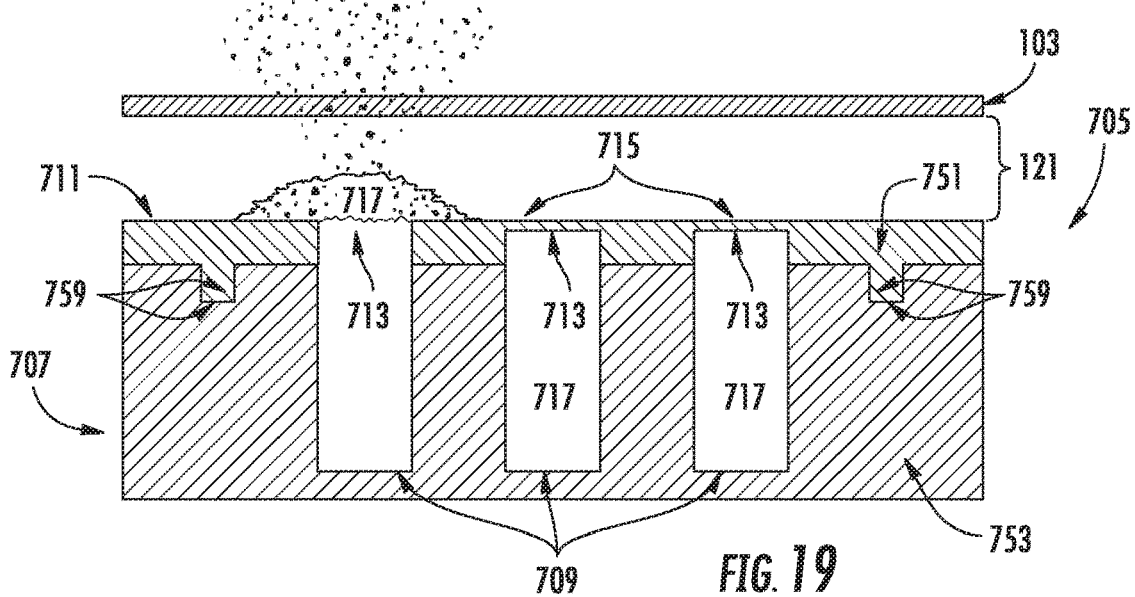

FIG. 17-19 illustrate the two-stage drug release method. Microchip element 705 includes three containment reservoirs 709 located in body portion 707 which is formed of a sealing chip 751 and a reservoir chip 753 bonded together with sealing structures 759. The sealing chip 751 includes a plurality of reservoir caps 715 which each seal corresponding drug release apertures 713. The body portion 707 of the microchip element 705 has an exterior wall 711. A depot space 121 is defined between the exterior wall 711 and the drug-permeable membrane 103. In FIG. 17, each containment reservoir 709 contains a drug formulation 717, and the reservoir caps 715 are intact.

Subsequently, the reservoir cap 715 on the left is activated and ruptured. As shown in FIG. 18, the drug formulation 713 from the activated reservoir has been transferred (by diffusion or ejection/extrusion) from the left reservoir 709, and collects in the depot space 121. As shown in this figure, a portion of the drug formulation 717 has begun to diffuse from the depot space 121 through the drug-permeable membrane 103. FIG. 19 shows the same system at a later time. As can be seen from the comparison of FIGS. 18 and 19, over time, the drug reservoir 709 is substantially emptied of the drug formulation 717, and most of the drug formulation 717 has diffuses from the depot space 121 through the drug permeable-membrane 103. The drug formulation in the depot space would continue to deplete, and a second reservoir could be activated to replenish the drug formulation in the depot space. These steps would be repeated as needed to provide a therapeutically effective concentration of the drug in the patient over a desired sustained period.

Figure 20:
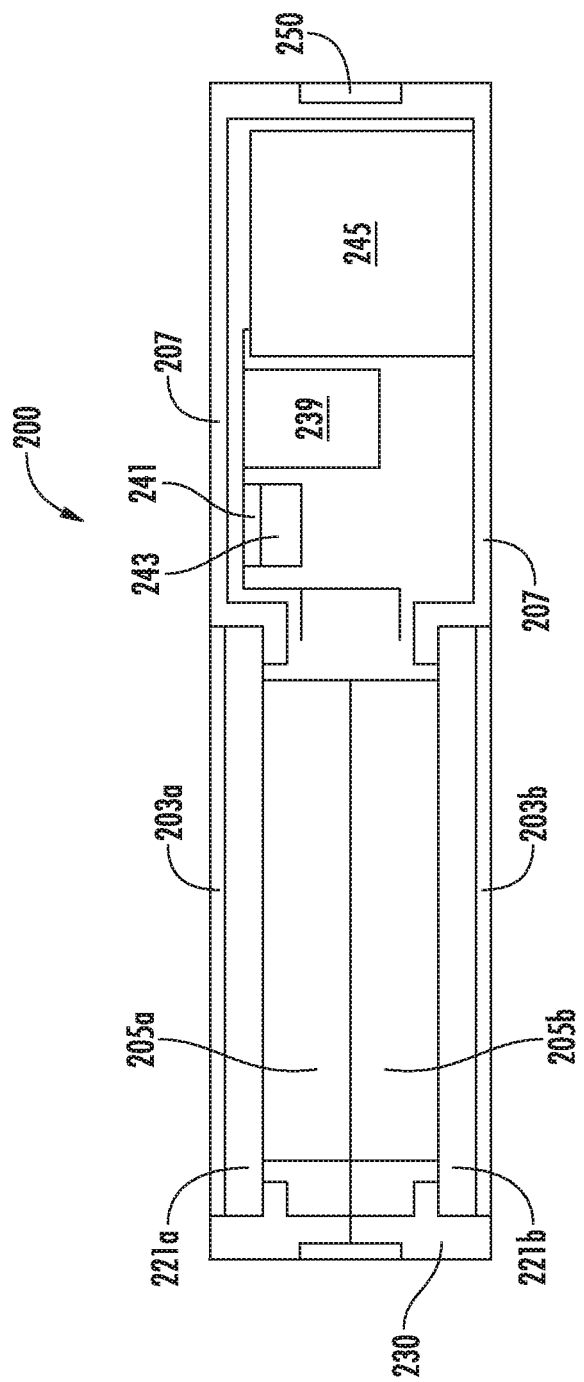
FIG. 20 is a cross-sectional view of a drug delivery device according to another embodiment of the present disclosure.

As mentioned above, in some embodiments, the device includes two microchip elements on opposed sides of the device and adjacent one another without electronic components positioned between the microchip elements. One embodiment of such a device is illustrated in FIG. 20. Device 200 includes two microchip elements 205a, 205b shown on the left side of the device and the electronics are disposed in the right side of the device. The electronics may include, for example, battery 245, capacitor 239, ACIS 241, microprocessor 243, and antenna 250. The device also includes upper/lower housing body 207 and side housing 230. Drug permeable membranes 203a, 203b are positioned on opposite sides (upper/lower sides) of the device. Depot spaces 821a, 821b are defined between the microchip elements 205a, 205b and the drug permeable membranes 203a, 203b, respectively. This design advantageously enables a thin and narrow device, in which drug capacity can be increased by increasing the number of reservoirs in one, or more likely both microchip elements by only lengthening the microchip elements, without enlarging the width or thickness of the overall device. This is beneficial to maintaining the narrow profile of the device such that is can be suitably implanted into a patient in a minimally invasive manner, and such that it can be reasonably discreet and comfortable to the patient when the device is subcutaneously located.

In some other embodiments the device include one or more microchip elements only one side of the device, and electronic components located on an opposing side of the one or more microchip elements or located in a position laterally adjacent to the one or more microchip elements. Examples of such embodiments can be envisioned as the device 101 in FIG. 2 without microchip element 105b and membrane 103b, or as the device 200 of FIG. 20 without microchip element 205b and membrane 203b.

The devices and methods described herein will be further understood by reference to the following non-limiting example.

Example 1

A drug delivery device was assembled according to an embodiment of the present disclosure, wherein the drug formulation included levonorgestrel, and drug-permeable membranes were made from a semi-permeable silicone material having a nominal thickness of 70 µm. The levonorgestrel formulation included 42% spray dried levonorgestrel with hyaluronic acid 1.8. Each of the microchip elements included 100 reservoirs, each having a capacity of 2 microliters. The drug delivery device was inserted into an aqueous environment 0.5% sodium dodecyl sulfate and 0.02% sodium azide in normal saline (0.9% sodium chloride), and 4 reservoirs were electrically activated to open using an electrothermal ablation mechanism at the beginning of the test. The levonorgestrel drug formulation was released into a depot space between each of the microchip elements and the drug-permeable membranes, and then allowed to diffuse from the drug depot spaces and into the aqueous environment through the silicone membrane.

Figure 16A:
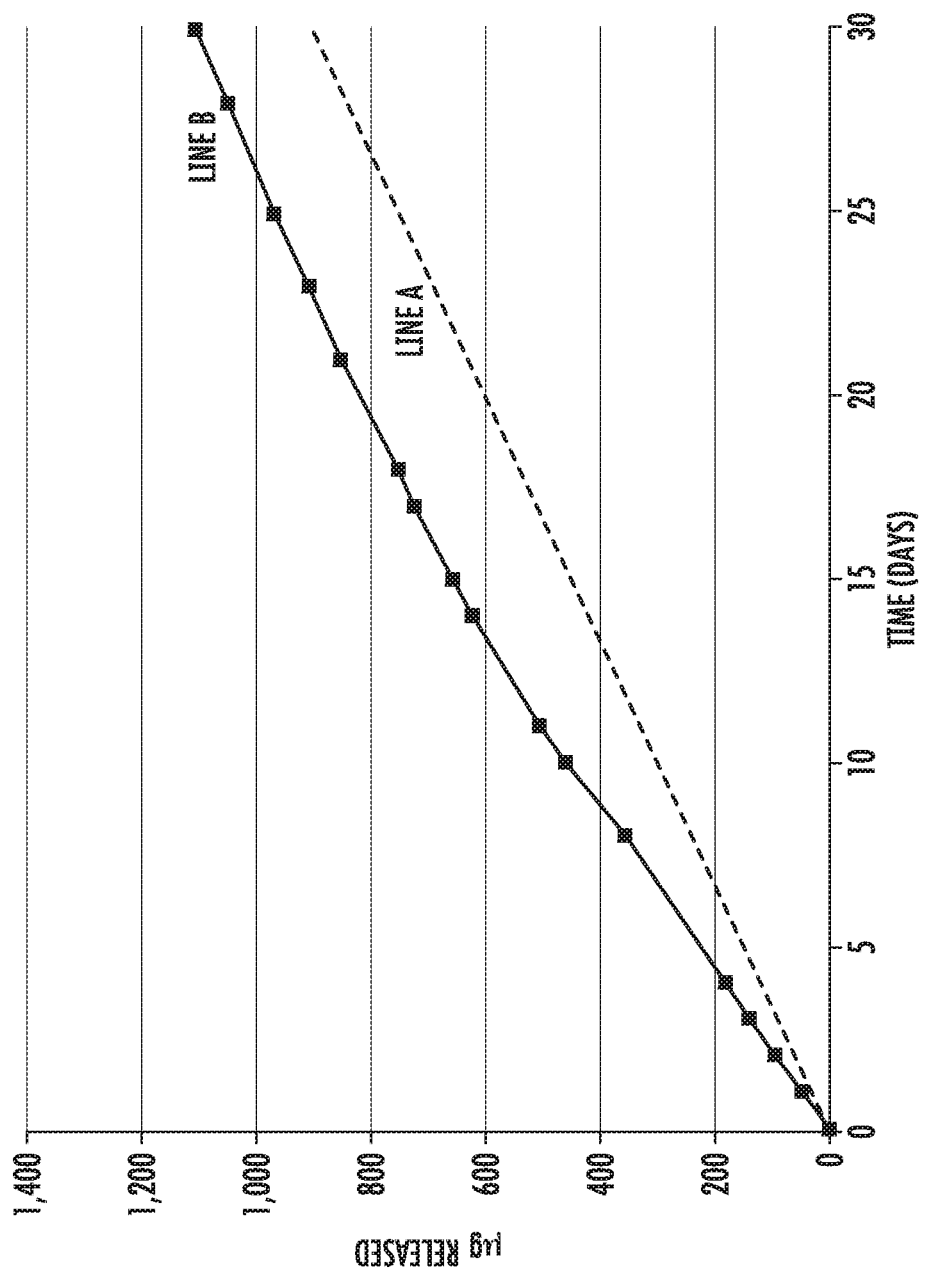
FIG. 16A is a graph of the cumulative amount of levonorgestrel released over time from a drug delivery device according to one embodiment of the present disclosure.
Figure 16B:
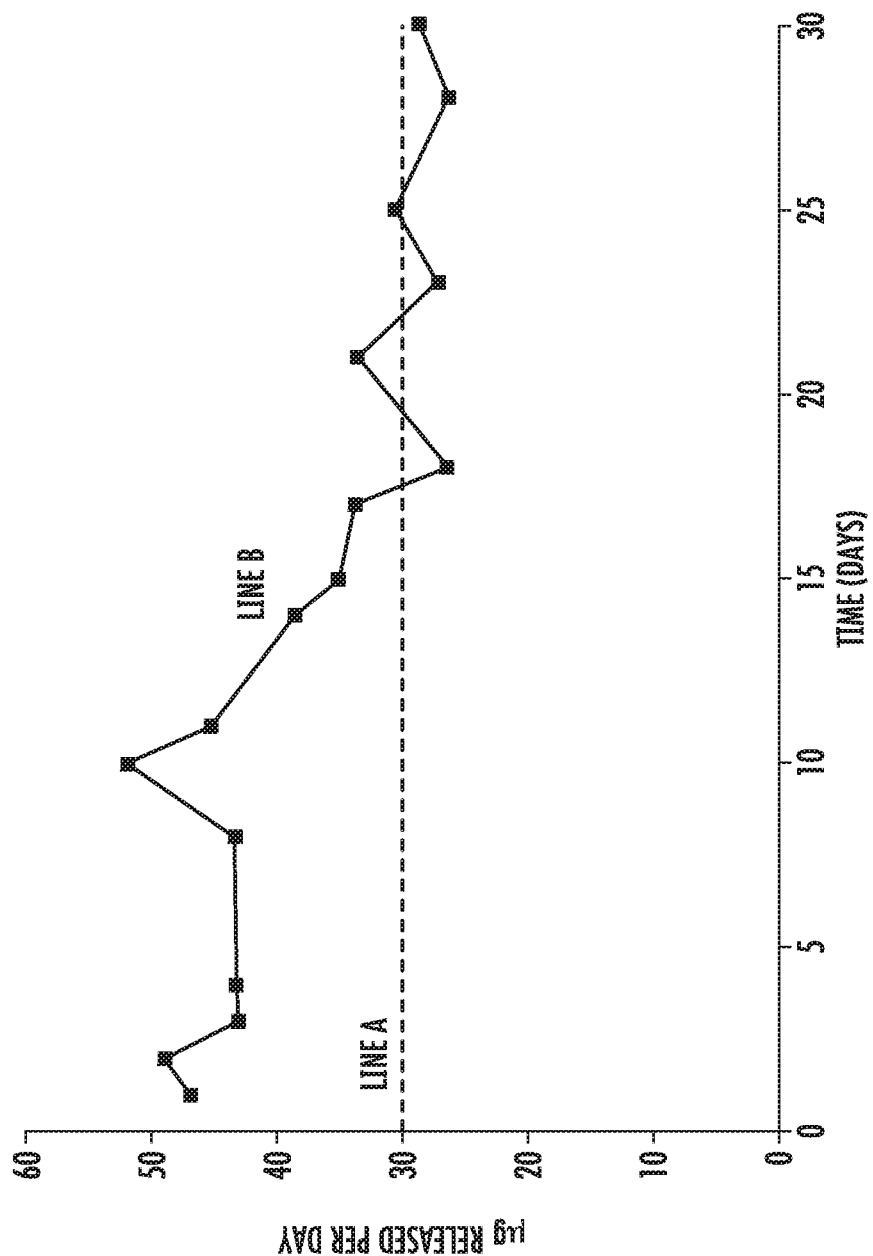
FIG. 16B is a graph of the amount of levonorgestrel released per day from a drug delivery device according to one embodiment of the present disclosure.

The aqueous environment was periodically sampled to measure the amount of levonorgestrel which had been released over time. An equivalent volume, chosen to maintain sink conditions, is removed and replaced with aqueous solution for every sampling. The sample is diluted as necessary to be quantified by high performance liquid chromatography (HPLC). All values are calculated against a standard curve. FIG. 16A shows the cumulative amount of levonorgestrel which was released from this drug delivery device and FIG. 16B shows the amount of levonorgestrel which was released per day, as individual measured data points on days 1, 2, 3, 4, 8, 10, 11, 14, 15, 17, 18, 21, 23, 25, 28, and 30 with a solid line B representing a linear regression of these data points. The dashed line A represents a release rate of 30 µm per day—the minimum daily dose which is required for levonorgestrel to be effective as a form of contraception. As can be seen from this figure, while this experimental drug delivery device releases more than the required 30 µg of levonorgestrel per day, it advantageously provides a linear release rate, as shown by the solid line B. That is, the drug delivery device released about the same amount of levonorgestrel (in µg) per day over the 30-day test.

Exemplary Embodiments

Embodiment 1. A drug delivery device, comprising: a microchip element which comprises a body portion defining at least one containment reservoir therein, wherein the body portion has an exterior wall having one or more drug release apertures in fluid communication with the at least one containment reservoir, the one or more drug release apertures being closed off by one or more corresponding reservoir caps configured to be electrically activated to unclose the one or more drug release apertures; a drug formulation, which comprise a drug, disposed in the at least one containment reservoir; and an outer housing wall secured in a position next to, and spaced a distance from, the exterior wall of the body portion of the microchip element, the outer housing wall comprising a drug-permeable membrane, wherein a depot space is defined between the drug-permeable membrane and the exterior wall of the body portion of the microchip element.

Embodiment 2. The drug delivery device of Embodiment 1, which is configured to operate in an aqueous environment and, upon activation of the one or more reservoir caps, release the drug into the depot space and subsequently diffuse through the drug-permeable membrane and into the aqueous environment.

Embodiment 3. The drug delivery device of Embodiment 1 or 2, wherein the drug delivery device is an implantable drug delivery device and the aqueous environment is in vivo in a patient.

Embodiment 4. The drug delivery device of any one of Embodiments 1 to 3, wherein reservoir caps are configured to rupture by electrothermal ablation when electrically activated.

Embodiment 5. The drug delivery device of any one of Embodiments 1 to 4, wherein the drug-permeable membrane comprises a polymeric membrane.

Embodiment 6. The drug delivery device of Embodiment 5, wherein the polymeric membrane comprises silicone, polyurethane, or a combination thereof.

Embodiment 7. The drug delivery device of any one of Embodiments 1 to 4, wherein the at least one containment reservoir further comprises a water swellable charge material.

Embodiment 8. The drug delivery device of Embodiment 7, wherein the water swellable charge material is in the form of a charge layer adjacent to a layer of the drug formulation, the drug formulation layer being disposed between the charge layer and the one or more drug release apertures.

Embodiment 9. The drug delivery device of Embodiment 7, wherein the water swellable charge material is dispersed with the drug in the drug formulation.

Embodiment 10. The drug delivery device of any one of Embodiments 7 to 9, wherein the water swellable charge material comprises hyaluronic acid.

Embodiment 11. The drug delivery device of any one of Embodiments 7 to 9, wherein the water swellable charge material comprises a hydrophilic polymer.

Embodiment 12. The drug delivery device of any one of Embodiments 1 to 11, wherein the outer housing wall further comprises a rigid frame supporting the drug-permeable membrane.

Embodiment 13. The drug delivery device of Embodiment 12, wherein the rigid frame defines two or more windows of the drug-permeable membrane.

Embodiment 14. The drug delivery device of Embodiment 12 or 13, wherein the rigid frame is part of a shell covering at least part of the microchip element.

Embodiment 15. The drug delivery device of any one of Embodiments 1 to 14, wherein the at least one containment reservoir is a microreservoir.

Embodiment 16. The drug delivery device of any one of Embodiments 1 to 15, wherein the drug comprises a hormone, such as a contraceptive hormone.

Embodiment 17. The drug delivery device of Embodiment 16, wherein the hormone comprise levonorgestrel.

Embodiment 18. The drug delivery device of any one of Embodiments 1 to 17, wherein the drug formulation is in solid form, such as a tablet.

Embodiment 19. The drug delivery device of any one of Embodiments 1 to 18, further comprising: a second microchip element which comprises a body portion defining at least one containment reservoir therein, wherein the second body portion has an exterior wall having one or more drug release apertures in fluid communication with the at least one containment reservoir, the one or more drug release apertures being closed off by one or more corresponding reservoir caps configured to be electrically activated to unclose the one or more drug release apertures; a drug formulation, which comprise a drug, disposed in the at least one containment reservoir of the second microchip element; and a second outer housing wall secured in a position next to, and spaced a distance from, the exterior wall of the body portion of the second microchip element, the outer housing wall comprising a second drug-permeable membrane, wherein a second depot space is defined between the second drug-permeable membrane and the exterior wall of the body portion of the second microchip element, wherein the outer housing wall of the microchip element and the second outer housing wall of the second microchip element are on opposing sides of the drug delivery device.

Embodiment 20. The drug delivery device of Embodiment 19, further comprising a hermetic enclosure disposed between the microchip element and the second microchip element.

Embodiment 21. The drug delivery device of Embodiment 20, wherein the hermetic enclosure is defined in part by a pair of printed circuit boards, each comprising a ceramic substrate.

Embodiment 22. The drug delivery device of Embodiment 20 or 21, wherein hermetic enclosure contains electronic components configured for electrical activation of the reservoir caps of the microchip element and the second microchip element.

Embodiment 23. An implantable drug delivery device, comprising: a microchip element which comprises a body portion defining a plurality of microreservoirs therein, wherein the body portion has an exterior wall having a plurality of drug release apertures in fluid communication with the microreservoirs, the plurality of drug release apertures being closed off by a plurality of corresponding reservoir caps configured to be ruptured by electrothermal ablation to open the drug release apertures; a drug disposed in each of the microreservoirs; a water swellable charge material disposed in each of the microreservoirs; and an outer housing wall secured in a position next to, and spaced a distance from, the exterior wall of the body portion of the microchip element, the outer housing wall comprising a drug-permeable membrane, wherein a depot space is defined between the drug-permeable membrane and the exterior wall of the body portion of the microchip element, wherein the device is configured to operate in vivo by permitting interstitial fluid, following activation of one or more of the plurality of reservoir caps, to contact and be imbibed by the water swellable charge material disposed the microreservoir(s) corresponding to the activated reservoir cap(s), and thereby cause the charge material to swell and eject the drug out of the microreservoir(s) through the drug release apertures and into the depot space for subsequent diffusion through the drug-permeable membrane.

Embodiment 24. The implantable drug delivery device of Embodiment 23, wherein the drug-permeable membrane comprises a polymeric membrane.

Embodiment 25. The implantable drug delivery device of Embodiment 24, wherein the polymeric membrane comprises silicone, polyurethane, or a combination thereof.

Embodiment 26. The implantable drug delivery device of any one of Embodiments 23 to 25, wherein the water swellable charge material is in the form of a charge layer adjacent to a layer of the drug, the drug layer being disposed between the charge layer and the drug release apertures.

Embodiment 27. The implantable drug delivery device of any one of Embodiments 23 to 26, wherein the water swellable charge material comprises hyaluronic acid.

Embodiment 28. The implantable drug delivery device of any one of Embodiments 23 to 26, wherein the water swellable charge material comprises a hydrophilic polymer.

Embodiment 29. The implantable drug delivery device of any one of Embodiments 23 to 28, wherein the outer housing wall further comprises a rigid frame supporting the drug-permeable membrane.

Embodiment 30. The implantable drug delivery device of Embodiment 29, wherein the rigid frame defines two or more windows of the drug-permeable membrane.

Embodiment 31. The implantable drug delivery device of Embodiment 29 or 30, wherein the rigid frame is part of a shell covering at least part of the microchip element.

Embodiment 32. The implantable drug delivery device of any one of Embodiments 23 to 31, wherein the drug comprises a hormone, such as a contraceptive hormone.

Embodiment 33. The implantable drug delivery device of Embodiment 32, wherein the hormone comprise levonorgestrel.

Embodiment 34. The implantable drug delivery device of any one of Embodiments 23 to 33, wherein the drug is in solid form, such as a tablet.

Embodiment 35. The implantable drug delivery device of any one of Embodiments 23 to 33, further comprising a hermetic enclosure fixed to the microchip element on a side opposed from the exterior wall and the depot space.

Embodiment 36. The implantable drug delivery device of Embodiment 35, wherein the hermetic enclosure is defined in part by a printed circuit boards, which comprises a ceramic substrate.

Embodiment 37. The implantable drug delivery device of Embodiment 35 or 36, wherein hermetic enclosure contains electronic components configured for controlling rupture of the reservoir caps.

Embodiment 38. The implantable drug delivery device of any one of Embodiments 23 to 37, further comprising a second microchip element and a second exterior wall which comprises a second drug-permeable membrane defining a second drug depot space.

Embodiment 39. A method of controlled drug delivery to a patient, comprising: implanting the drug delivery device of any one of Embodiments 1 to 22 in the patient; activating at least one of the one or more reservoir caps to permit interstitial fluid to contact the drug in the containment reservoir corresponding to the activated reservoir cap(s) and transfer the drug into the drug depot space and therein form a drug depot; and releasing the drug from the device by diffusion of the drug from the drug depot through the drug-permeable membrane.

Embodiment 40. The method of Embodiment 39, wherein the transfer of the drug from the containment reservoir to the drug depot space comprises swelling of a water swellable charge material to eject the drug from the containment reservoir.

Embodiment 41. A method of controlled drug delivery to a patient, comprising: implanting the implantable drug delivery device of any one of Embodiments 23 to 38 at an implantation site in the patient; rupturing at least one reservoir cap to expose the water swellable charge material in the microreservoir corresponding to the activated at least one reservoir cap to interstitial fluid at the implantation site; imbibing water from the interstitial fluid to swell the exposed water swellable charge material and eject the drug into the drug depot space, forming a drug depot therein; and releasing the drug from the device by diffusion of the drug from the drug depot through the drug-permeable membrane.

Embodiment 42. A drug delivery device, comprising: a microchip element which comprises a body portion defining at least one containment reservoir therein, wherein the body portion has an exterior wall having one or more drug release apertures in fluid communication with the at least one containment reservoir, the one or more drug release apertures being closed off by one or more corresponding reservoir caps configured to be electrically activated to unclose the one or more drug release apertures; a drug formulation, which comprise a first drug, disposed in the at least one containment reservoir; and a drug-permeable membrane secured next to the exterior wall of the body portion of the microchip element, wherein the device is configured to operate in an aqueous environment and, upon activation of the one or more reservoir caps, release the drug by diffusion through the drug-permeable membrane and into the aqueous environment.

Embodiment 43. The drug delivery device of Embodiment 42, wherein the drug delivery device is an implantable drug delivery device and the aqueous environment is in vivo in a patient.

Embodiment 44. The drug delivery device of Embodiment 42 or 43, wherein reservoir caps are configured to rupture by electrothermal ablation when electrically activated.

Embodiment 45. The drug delivery device of any one of Embodiments 42 to 44, wherein the drug-permeable membrane comprises a polymeric membrane.

Embodiment 46. The drug delivery device of Embodiment 45, wherein the polymeric membrane comprises silicone, polyurethane, or a combination thereof.

Embodiment 47. The drug delivery device of any one of Embodiments 42 to 46, wherein the exterior wall is in direct mechanical contact with the drug permeable membrane.

Embodiment 48. The drug delivery device of any one of Embodiments 42 to 47, which is configured to release the drug from the activated at least one containment reservoir by a process comprising swelling of the drug formulation and/or by an extrusion process.

Embodiment 49. The drug delivery device of any one of Embodiments 1 to 48, wherein the at least one containment reservoir further comprises a water swellable charge material.

Embodiment 50. The drug delivery device of Embodiment 49, wherein the water swellable charge material and the drug formulation in the at least one containment reservoir are combined in the form of at least one tablet.

Embodiment 51. The drug delivery device of Embodiment 50, wherein the at least one tablet comprises a mixture of particles of the drug with one or more excipients comprising the water swellable charge material.

Embodiment 52. The drug delivery device Embodiment 51, wherein the drug particles have a median size from about 5 microns to about 12 microns.

Embodiment 53. The drug delivery device of any one of Embodiments 50 to 52, wherein the at least one tablet is from about 10% to about 50% drug particles, by weight.

Embodiment 54. The drug delivery device of any one of Embodiments 50 to 52, wherein the at least one tablet is from about 20% to about 45% drug particles, by weight.

Embodiment 55. The drug delivery device of any one of Embodiments 50 to 52, wherein the at least one tablet is from about 30% to about 42% drug particles, by weight.

Embodiment 56. The drug delivery device of any one of Embodiments 50 to 55, wherein the at least one tablet has a density from 1 $mg/mm^3$ to 1.3 $mg/mm^3$, a height from 0.67 mm to 0.95 mm, or both a density from 1 $mg/mm^3$ to 1.3 $mg/mm^3$ and a height from 0.67 mm to 0.95 mm.

Embodiment 57. The drug delivery device of any one of Embodiments 1 to 56, wherein the drug permeable membrane has a surface area from 100 $mm^2$ to 200 $mm^2$, a thickness of from 70 μm to 75 μm, or both a surface area from 100 $mm^2$ to 200 $mm^2$ and a thickness of from 70 μm to 75 μm.

Embodiment 58. The drug delivery device of any one of Embodiments 1 to 57, wherein the drug permeable membrane comprises silicone, has a surface area of about 200 $mm^2$, and has a thickness of about 72 μm.

Embodiment 59. The drug delivery device of any one of Embodiments 1 to 58, further comprising: a second microchip element which comprises a body portion defining at least one containment reservoir therein, wherein the second body portion has an exterior wall having one or more drug release apertures in fluid communication with the at least one containment reservoir, the one or more drug release apertures being closed off by one or more corresponding reservoir caps configured to be electrically activated to unclose the one or more drug release apertures; a drug formulation, which comprise a second drug, disposed in the at least one containment reservoir of the second microchip element; and a second drug-permeable membrane secured next to the exterior wall of the body portion of the second microchip element, wherein the device, upon activation of the one or more reservoir caps of the second microchip element, is configured to release the second drug by diffusion through the second drug-permeable membrane and into the aqueous environment.

Embodiment 60. The drug delivery device of Embodiment 59, where the second drug is identical to the first drug.

Embodiment 61. The drug delivery device of Embodiment 59 or 60, further comprising a hermetic enclosure which contains electronic components configured for electrical activation of the one or more reservoir caps of the microchip element and the second microchip element.

Embodiment 62. The drug delivery device of Embodiment 61, wherein the hermetic enclosure is disposed between the microchip element and the second microchip element.

Embodiment 63. The drug delivery device of Embodiment 61, wherein (i) the hermetic enclosure is not disposed between the microchip element and the second microchip element, and (ii) the first and second microchip elements are disposed adjacent one another with their exterior walls facing in opposite directions.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

That which is claimed is:

1. A drug delivery device, comprising:
a microchip element which comprises a body portion defining at least one containment reservoir therein, wherein the body portion has an exterior wall having one or more drug release apertures in fluid communication with the at least one containment reservoir, the one or more drug release apertures being closed off by one or more corresponding reservoir caps configured to be electrically activated to unclose the one or more drug release apertures,
a drug formulation, which comprises a first drug, disposed in the at least one containment reservoir; and
a drug-permeable membrane secured next to the exterior wall of the body portion of the microchip element and outside of the at least one containment reservoir, wherein the device is configured to operate in an aqueous environment and, upon activation of the one or more reservoir caps, release the drug by diffusion through the drug-permeable membrane and into the aqueous environment; and
an outer housing wall secured in a position next to, and spaced a distance from, the exterior wall of the body portion of the microchip element, the outer housing wall comprising the drug-permeable membrane, wherein a depot space is definable between the drug-permeable membrane and the exterior wall of the body portion of the microchip element, and wherein the drug delivery device is configured to release the drug into the depot space and subsequently diffuse through the drug-permeable membrane and into the aqueous environment.

2. The drug delivery device of claim 1, wherein the exterior wall is in direct mechanical contact with the drug permeable membrane.

3. The drug delivery device of claim 1, wherein the outer housing wall further comprises a rigid frame supporting the drug-permeable membrane.

4. The drug delivery device of claim 3, wherein the rigid frame defines two or more windows of the drug-permeable membrane.

5. The drug delivery device of claim 3, wherein the rigid frame is part of a shell covering at least part of the microchip element.

6. The drug delivery device of claim 1, wherein the drug-permeable membrane comprises silicone, polyurethane, or another polymeric membrane.

7. The drug delivery device of claim 1, wherein the drug formulation is in the form of a tablet.

8. The drug delivery device of claim 1, which is configured to release the drug from the activated at least one containment reservoir by a process comprising swelling of the drug formulation and/or by an extrusion process.

9. The drug delivery device of claim 1, wherein the at least one containment reservoir further comprises a water swellable charge material.

10. The drug delivery device of claim 9, wherein the water swellable charge material is in the form of a charge layer adjacent to a layer of the drug formulation, the drug formulation layer being disposed between the charge layer and the one or more drug release apertures.

11. The drug delivery device of claim 9, wherein the water swellable charge material is dispersed with the drug in the drug formulation.

12. The drug delivery device of claim 9, wherein the water swellable charge material comprises hyaluronic acid or a hydrophilic polymer.

13. The drug delivery device of claim 9, wherein the water swellable charge material and the drug formulation in the at least one containment reservoir are combined in the form of at least one tablet.

14. The drug delivery device of claim 13, wherein the at least one tablet comprises a mixture of particles of the drug with one or more excipients comprising the water swellable charge material.

15. The drug delivery device of claim 14, wherein the drug particles have a median size from about 5 microns to about 12 microns.

16. The drug delivery device of claim 14, wherein the at least one tablet is from about 10% to about 50% drug particles, by weight.

17. The drug delivery device of claim 14, wherein the at least one tablet has a density from 1 mg/mm$^3$ to 1.3 mg/mm$^3$, a height from 0.67 mm to 0.95 mm, or both a density from 1 mg/mm$^3$ to 1.3 mg/mm$^3$ and a height from 0.67 mm to 0.95 mm.

18. The drug delivery device of claim 1, wherein the drug permeable membrane has a surface area from 100 mm$^2$ to 200 mm$^2$, a thickness of from 70 μm to 75 μm, or both a surface area from 100 mm$^2$ to 200 mm$^2$ and a thickness of from 70 μm to 75 μm.

19. The drug delivery device of claim 1, wherein the drug permeable membrane comprises silicone, has a surface area of about 200 mm$^2$, and has a thickness of about 72 μm.

20. The drug delivery device of claim 1, wherein the drug comprises levonorgestrel or another contraceptive hormone.

21. The drug delivery device of claim 1, wherein reservoir caps are configured to rupture by electrothermal ablation when electrically activated.

22. The drug delivery device of claim 1, further comprising:
a second microchip element which comprises a body portion defining at least one containment reservoir therein, wherein the second body portion has an exterior wall having one or more drug release apertures in fluid communication with the at least one containment reservoir, the one or more drug release apertures being closed off by one or more corresponding reservoir caps configured to be electrically activated to unclose the one or more drug release apertures;
a drug formulation, which comprise a drug, disposed in the at least one containment reservoir of the second microchip element; and
a second drug-permeable membrane secured next to the exterior wall of the body portion of the second microchip element, wherein the device is configured, upon activation of the one or more reservoir caps of the second microchip element, to release the drug therefrom by diffusion through the second drug-permeable membrane and into the aqueous environment,
wherein, optionally, a second outer housing wall, which comprises the second drug permeable membrane is secured in a position next to, and spaced a distance from, the exterior wall of the body portion of the second microchip element, to define a second depot space between the second drug-permeable membrane and the exterior wall of the body portion of the second microchip element.

23. The drug delivery device of claim 22, further comprising a hermetic enclosure disposed between the microchip element and the second microchip element, wherein hermetic enclosure contains electronic components configured for electrical activation of the reservoir caps of the microchip element and the second microchip element.

24. The drug delivery device of claim 23, wherein the hermetic enclosure is defined in part by a pair of printed circuit boards, each comprising a ceramic substrate.

25. The drug delivery device of claim 1, which is an implantable drug delivery device, wherein:
the microchip element comprises a plurality of microreservoirs and the body portion has a plurality of drug release apertures in fluid communication with the microreservoirs, the plurality of drug release apertures being closed off by a plurality of corresponding reservoir caps configured to be ruptured by electrothermal ablation to open the drug release apertures;
the drug is disposed in each of the microreservoirs;
a water swellable charge material is disposed in each of the microreservoirs; and
the device is configured to operate in vivo by permitting interstitial fluid, following activation of one or more of the plurality of reservoir caps, to contact and be imbibed by the water swellable charge material disposed the microreservoirs corresponding to the activated reservoir cap(s), and thereby cause the charge material to swell and eject the drug out of the microreservoir(s) through the drug release apertures and into the depot space for subsequent diffusion through the drug-permeable membrane.

26. The drug delivery device of claim 1, further comprising a second microchip element and a second exterior wall which comprises a second drug-permeable membrane defining a second drug depot space.

27. The drug delivery device of claim 26, further comprising a hermetic enclosure, wherein (i) the hermetic enclosure is not disposed between the microchip element and the second microchip element, and (ii) the first and second microchip elements are disposed adjacent one another with their exterior walls facing in opposite directions.

28. The drug delivery device of claim 26, wherein the microchip elements are located on a single side of the device and electronic components are located on an opposing side of the microchip elements.

29. The drug delivery device of claim 28, further comprising a hermetic enclosure fixed to the microchip elements on a side opposed from the depot space.

30. A drug delivery device, comprising:
a microchip element which comprises a body portion defining a plurality of microreservoirs therein, wherein the body portion has an exterior wall having a plurality of drug release apertures in fluid communication with the microreservoirs, the drug release apertures being closed off by corresponding reservoir caps configured to be electrically activated to unclose the drug release apertures;
a drug formulation, which comprise a first drug, disposed in the microreservoirs; and
an outer housing wall secured in a position next to the exterior wall of the body portion of the microchip element, the outer housing wall comprising a drug-permeable membrane,
wherein the drug delivery device is configured to operate in an aqueous environment and, upon activation of the reservoir caps, release the drug into a depot space defined between the drug-permeable membrane and the exterior wall of the body portion of the microchip element and subsequently diffuse through the drug-permeable membrane and into the aqueous environment.

31. The drug delivery device of claim 30, further comprising a water swellable charge material disposed in each of the microreservoirs, wherein the charge material is configured to swell and eject the drug out of the microreservoirs through the drug release apertures and into the depot space.

* * * * *